(12) United States Patent
Cho et al.

(10) Patent No.: US 12,455,539 B2
(45) Date of Patent: Oct. 28, 2025

(54) ELECTRONIC DEVICE COMPRISING ELECTRODE BUTTON

(71) Applicant: Samsung Electronics Co., Ltd., Suwon-si (KR)

(72) Inventors: Seunghyun Cho, Suwon-si (KR); June Lee, Suwon-si (KR); Junhui Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 18/159,950

(22) Filed: Jan. 26, 2023

(65) Prior Publication Data

US 2023/0176530 A1    Jun. 8, 2023

Related U.S. Application Data

(63) Continuation of application No. PCT/KR2021/009821, filed on Jul. 28, 2021.

(30) Foreign Application Priority Data

Aug. 3, 2020 (KR) .................. 10-2020-0097019

(51) Int. Cl.
  *G04G 17/06* (2006.01)
  *G04G 17/08* (2006.01)
  *G04G 21/02* (2010.01)
(52) U.S. Cl.
  CPC ............. *G04G 17/06* (2013.01); *G04G 17/08* (2013.01); *G04G 21/025* (2013.01)
(58) Field of Classification Search
  CPC ...... G04G 17/06; G04G 17/08; G04G 21/025; G04G 17/04; G04G 17/00; G04G 21/00;
  (Continued)

(56) References Cited

U.S. PATENT DOCUMENTS 5,774,427 A    6/1998   Rebeaud
9,620,312 B2 *  4/2017   Ely .................. G06F 1/163
(Continued)

FOREIGN PATENT DOCUMENTS

EP      3451117 A1     6/2019
JP      H05-168506 A   7/1993
(Continued)

OTHER PUBLICATIONS

Extended European Search Report dated Oct. 20, 2023, issued in European Patent Application No. 21854312.2.

*Primary Examiner* — Edwin A. Leon
(74) *Attorney, Agent, or Firm* — Jefferson IP Law, LLP

(57) ABSTRACT

An electronic device is provided. The electronic device includes a housing, a button member which is coupled to the housing and at least a portion of which is exposed to the outside of the housing, a bracket which is disposed inside the housing and on which a circuit board is mounted, a connection member which is disposed in the bracket and is electrically connected to the circuit board, and a conductive structure which is disposed in one portion of the connection member so as to be in contact with the button member, and which is electrically connected to the connection member and the button member, wherein the conductive structure comprises a contact portion in contact with the button member and a fixed portion which extends from the contact portion to the connection member so as to space the contact portion and the connection member apart from each other.

21 Claims, 17 Drawing Sheets

(58) Field of Classification Search
CPC .. G04G 21/08; A61B 2560/0468; A61B 5/681
See application file for complete search history.

(56) References Cited

U.S. PATENT DOCUMENTS

| | | | |
|---|---|---|---|
| 9,627,163 B2 | 4/2017 | Ely et al. | |
| 9,836,025 B2 | 12/2017 | Ely et al. | |
| 9,971,305 B2 | 5/2018 | Ely et al. | |
| 10,133,910 B2 | 11/2018 | Chang et al. | |
| 10,175,652 B2 | 1/2019 | Ely et al. | |
| 10,216,147 B2 | 2/2019 | Ely et al. | |
| 10,318,025 B2 | 6/2019 | Lee et al. | |
| 10,331,081 B2 | 6/2019 | Ely et al. | |
| 10,474,194 B1 | 11/2019 | Eli et al. | |
| 10,572,053 B2 | 2/2020 | Ely et al. | |
| 10,599,101 B2 | 3/2020 | Rothkopf et al. | |
| 10,610,157 B2 | 4/2020 | Pandya et al. | |
| 10,613,485 B2 | 4/2020 | Rothkopf et al. | |
| 10,620,591 B2 | 4/2020 | Rothkopf et al. | |
| 10,627,783 B2 | 4/2020 | Rothkopf et al. | |
| 10,838,463 B2 | 11/2020 | Park et al. | |
| 10,852,855 B2 | 12/2020 | Niu et al. | |
| 10,866,619 B1* | 12/2020 | Bushnell | G06F 1/1656 |
| 10,948,880 B2 | 3/2021 | Ely et al. | |
| 10,987,054 B2 | 4/2021 | Pandya et al. | |
| 11,181,863 B2 | 11/2021 | Ely et al. | |
| 11,194,298 B2 | 12/2021 | Roach et al. | |
| 11,287,779 B2 | 3/2022 | Spencer et al. | |
| 11,360,440 B2* | 6/2022 | Perkins | G04C 3/004 |
| 11,385,599 B2 | 7/2022 | Ely et al. | |
| 11,432,766 B2 | 9/2022 | Pandya et al. | |
| 2015/0041289 A1 | 2/2015 | Ely | |
| 2016/0291702 A1 | 10/2016 | Lee et al. | |
| 2016/0378071 A1 | 12/2016 | Rothkopf | |
| 2017/0213068 A1 | 7/2017 | Chang et al. | |
| 2017/0296088 A1* | 10/2017 | Choi | A61B 5/165 |
| 2018/0173279 A1 | 6/2018 | Park et al. | |
| 2018/0220972 A1 | 8/2018 | Jeong et al. | |
| 2018/0246469 A1 | 8/2018 | Ely et al. | |
| 2018/0329368 A1 | 11/2018 | Ely et al. | |
| 2019/0072912 A1 | 3/2019 | Pandya et al. | |
| 2019/0101870 A1 | 4/2019 | Pandya et al. | |
| 2020/0050154 A1 | 2/2020 | Spencer et al. | |
| 2020/0064774 A1 | 2/2020 | Ely et al. | |
| 2020/0064779 A1 | 2/2020 | Pandya et al. | |
| 2020/0073339 A1 | 3/2020 | Roach et al. | |
| 2020/0167010 A1 | 5/2020 | Niu et al. | |
| 2020/0229761 A1 | 7/2020 | Pandya et al. | |
| 2021/0204876 A1 | 7/2021 | Pandya et al. | |
| 2023/0098960 A1 | 3/2023 | Pandya et al. | |
| 2023/0210461 A1 | 7/2023 | Pandya et al. | |

FOREIGN PATENT DOCUMENTS

| | | |
|---|---|---|
| JP | H10-160869 A | 6/1998 |
| KR | 10-2016-0118565 A | 10/2016 |
| KR | 10-2017-0087684 A | 7/2017 |
| KR | 10-2018-0070243 A | 6/2018 |
| KR | 10-2018-0090616 A | 8/2018 |
| KR | 10-2018-0114157 A | 10/2018 |
| KR | 10-2020-0027010 A | 3/2020 |
| WO | 2018/166125 A1 | 9/2018 |

* cited by examiner

ELECTRONIC DEVICE COMPRISING ELECTRODE BUTTON

CROSS-REFERENCE TO RELATED APPLICATION(S)

This application is a continuation application, claiming priority under § 365(c), of an International application No. PCT/KR2021/009821, filed on Jul. 28, 2021, which is based on and claims the benefit of a Korean patent application number 10-2020-0097019, filed on Aug. 3, 2020, in the Korean Intellectual Property Office, the disclosure of which is incorporated by reference herein in its entirety.

BACKGROUND

1. Field

The disclosure relates to an electronic device including an electrode button. More particularly, the disclosure relates to a wearable electronic device for measuring biometric information through an electrode button.

2. Description of Related Art

With the common use of portable devices such as smartphones, wearable electronic devices (e.g., smart watches) used in conjunction with the smartphones have been increasingly used. The wearable electronic devices may be connected with the smartphones through wired or wireless communication and may provide users with various functions or operations provided by the smartphones. Due to the convenience, the spread of wearable electronic devices such as smart watches have been on the rise.

An electronic device that can be worn on a human body may be maintained for a considerable amount of time in a state of being brought into contact with a user's body and may thus be usefully used in medical or health care. For example, the electronic device may detect the user's biometric information, such as photo plethysmo graph (PPG), sleep section, skin temperature, heart rate, or electrocardiogram, depending on a sensor mounted therein, and the detected biometric information may be stored in the electronic device or transmitted to a medical institution and may be used for health care of the user.

The above information is presented as background information only to assist with an understanding of the disclosure. No determination has been made, and no assertion is made, as to whether any of the above might be applicable as prior art with regard to the disclosure.

SUMMARY

To measure a user's biometric information, for example, an electrocardiogram through a wearable electronic device such as a smart watch, an electrode member exposed outside the wearable electronic device and a connecting structure for electrically connecting the electrode member with a processor in the electronic device may be required.

To this end, the electronic device may include a conductive structure that electrically connects the electrode member and a circuit board. The conductive structure has to be disposed on a separate support member, and the support member having the conductive structure disposed thereon has to be assembled in a lateral direction in a front case having the electrode member coupled thereto. Therefore, the electronic device may not be easy to assemble.

Aspects of the disclosure are to address at least the above-mentioned problems and/or disadvantages and to provide at least the advantages described below. Accordingly, an aspect of the disclosure is to provide an electronic device in which a front case and a conductive structure are vertically assembled through the conductive structure including a curved region.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a button member coupled to the housing, at least a portion of the button member being exposed outside the housing, a bracket that is disposed in the housing and that has a circuit board seated thereon, a connecting member disposed on the bracket and electrically connected with the circuit board, and a conductive structure disposed on a portion of the connecting member to make contact with the button member and electrically connected with the connecting member and the button member. The conductive structure includes a contact portion that at least partially makes contact with the button member and a fixed portion that extends from the contact portion to the connecting member to space the contact portion and the connecting member apart from each other, and the contact portion has a shape in which at least part of the contact portion is bent toward the connecting member.

In accordance with another aspect of the disclosure, a wearable electronic device is provided. The wearable electronic device includes a housing that forms at least a portion of an exterior of the wearable electronic device and that includes a front surface, a rear surface that faces away from the front surface, and a side surface that surrounds a space between the front surface and the rear surface, a display disposed in the housing so as to be visually exposed through the front surface of the housing, a button member coupled to the side surface of the housing, at least a portion of the button member being exposed outside the housing, a bracket that is disposed between the display and the rear surface and that has a circuit board seated thereon, a connecting member disposed on the bracket to face toward the side surface of the housing and electrically connected with the circuit board, and a conductive structure disposed on a portion of the connecting member to make contact with the button member and electrically connected with the connecting member and the button member. The conductive structure includes a contact portion that at least partially makes contact with the button member and a fixed portion that extends from the contact portion to the connecting member to space the contact portion and the connecting member apart from each other. The contact portion includes a flat region that makes contact with the button member and a curved region that curvedly extends from the flat region. The curved region is formed in a shape bent toward the connecting member along a direction toward the front surface of the housing.

According to the various embodiments of the disclosure, by applying the curved shape corresponding to the assembly direction of the bracket to at least a portion of the conductive structure, the vertical assembly structure may be implemented without damage to the conductive structure.

Furthermore, according to the various embodiments of the disclosure, the conductive structure seated on the bracket may be vertically assembled in the front case together with the bracket. Accordingly, a separate part for supporting the conductive structure may be omitted, and thus effects of simplifying an assembly process and reducing material costs may be achieved.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that changes and modification of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
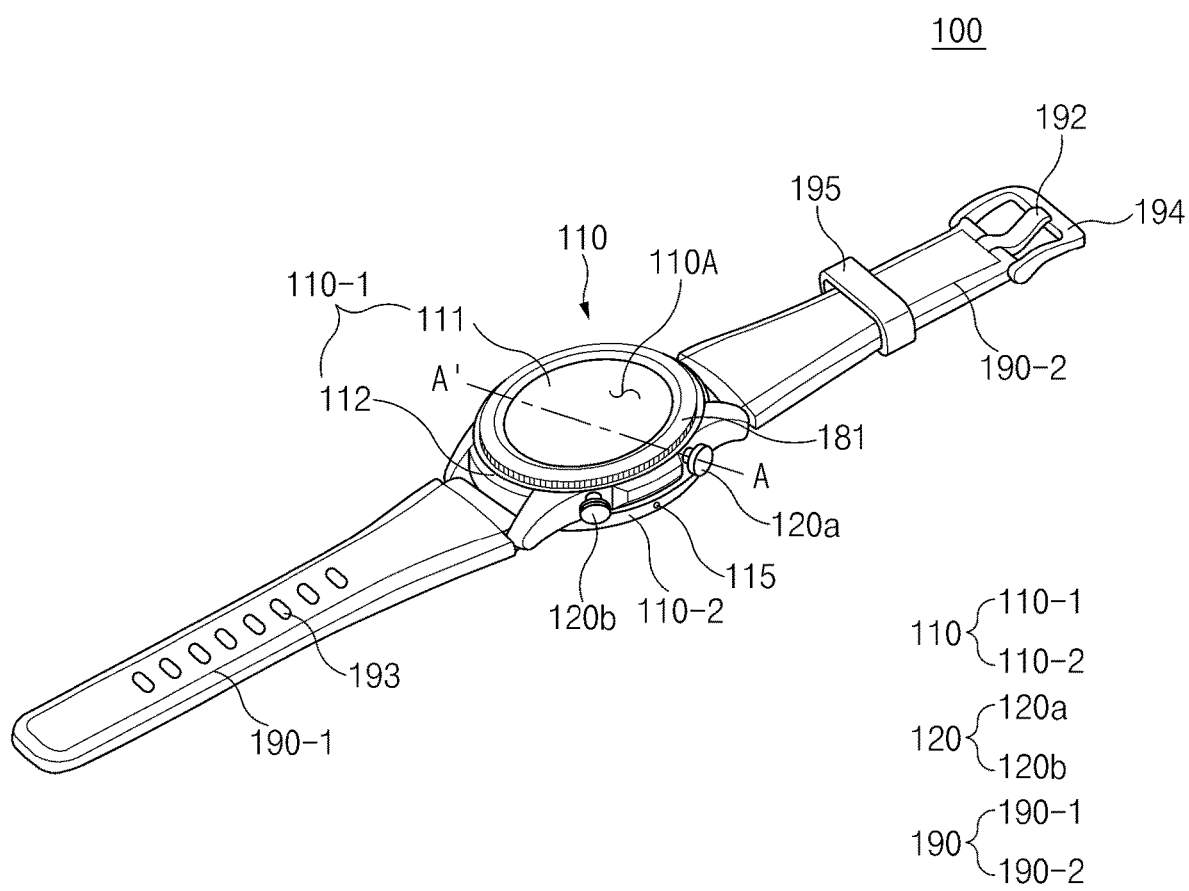
FIG. 1 is a front perspective view of an electronic device according to an embodiment of the disclosure.

FIG. 1 is a front perspective view of an electronic device according to an embodiment of the disclosure.

Figure 2:
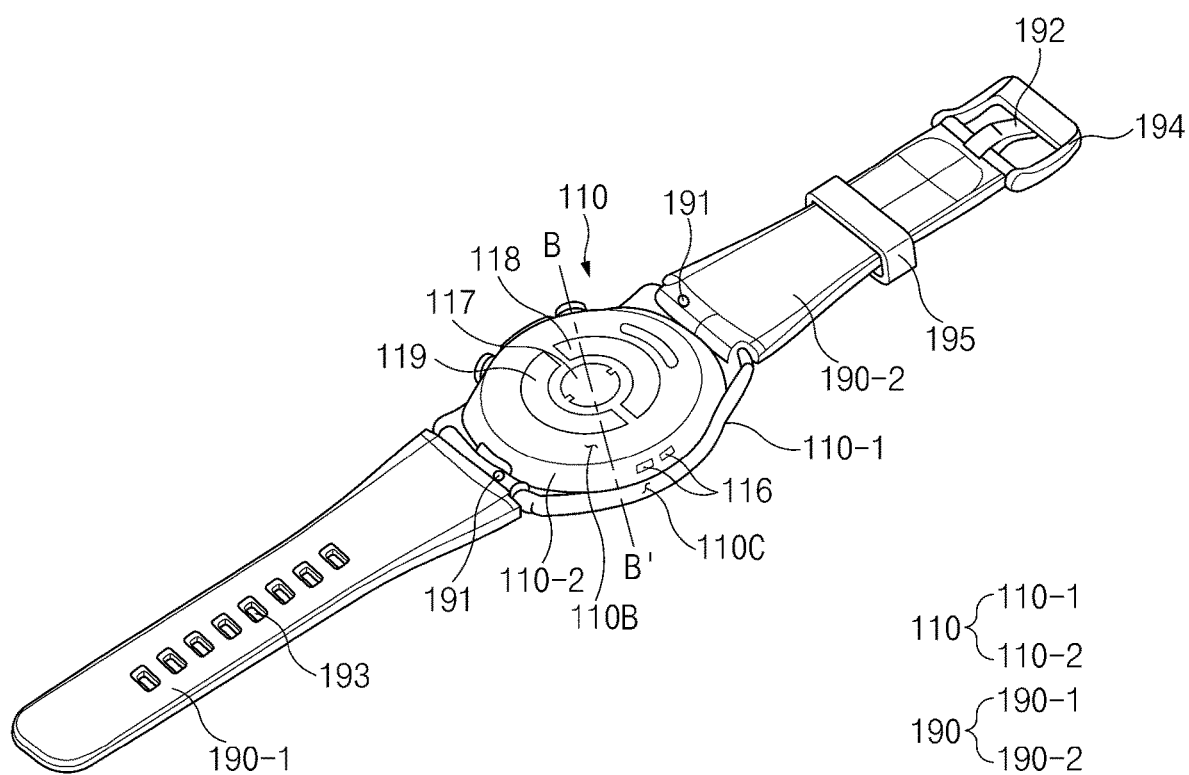
FIG. 2 is a rear perspective view of the electronic device according to an embodiment of the disclosure.

FIG. 2 is a rear perspective view of the electronic device according to an embodiment of the disclosure.

Referring to FIGS. 1 and 2, the electronic device 100 according to an embodiment may include a housing 110, key input devices 120 and 181, an audio module 115 and 116, a sensor module (including biosensor modules 117, 118, and 119), and a fastening member 190.

The electronic device 100 according to an embodiment may be a wearable electronic device. For example, the electronic device 100 may be a watch type electronic device (e.g., a smart watch) wearable on a part of a user's body (e.g., a wrist or an ankle). However, the electronic device is not limited to the illustrated embodiment.

In an embodiment, the housing 110 may form at least a portion of an exterior of the electronic device 100. The housing 110 may include a front case 110-1 and a rear case 110-2. The front case 110-1 and the rear case 110-2 may be coupled with each other. For example, the housing 110 may provide, through a coupling structure of the front case 110-1 and the rear case 110-2, an inner space in which other components of the electronic device 100 (e.g., a bracket 130, a circuit board 170, a display 182, and/or a battery 183 of FIGS. 3 and 4) are accommodated.

In an embodiment, the housing 110 may include a front surface 110A, a rear surface 110B facing away from the front surface 110A, and a side surface 110C surrounding a space between the front surface 110A and the rear surface 110B. For example, the front case 110-1 may form at least portions of the front surface 110A and the side surface 110C of the housing 110, and the rear case 110-2 may form at least a portion of the rear surface 110B of the housing 110. The front case 110-1 may include a front plate 111 that forms at least a portion of the front surface 110A and a side frame 112 (e.g., a side bezel or a side member) that forms at least a portion of the side surface 110C. According to various embodiments of the disclosure, the housing 110 may refer to a structure that forms some of the front surface 110A, the rear surface 110B, and the side surface 110C.

In an embodiment, the front surface 110A and the side surface 110C may be included in the front case 110-1, and the rear surface B may be included in the rear case 110-2.

For example, at least a portion of the front surface 110A may be formed by the front plate 111 that is substantially transparent. The front plate 111 may be formed of a glass plate including various coating layers, or a polymer plate. The rear surface 110B may be formed by the rear case 110-2 that is substantially opaque. The rear case 110-2 may be formed of coated or colored glass, ceramic, a polymer, metal (e.g., aluminum, stainless steel (STS), or magnesium), or a combination of at least two of the aforementioned materials. The side surface 110C may be formed by the side frame 112 (e.g., the side bezel or the side member) that is coupled with the front plate 111 and the rear case 110-2. The side frame 112 may include metal and/or a polymer. According to various embodiments of the disclosure, the side frame 112 may be integrally formed with the rear case 110-2. For example, the rear case 110-2 and the side frame 112 may be integrally formed with each other and may include the same material (e.g., a metallic material such as aluminum).

The electronic device 100 according to an embodiment may include a display (e.g., the display 182 of FIGS. 3 and 4) disposed in the housing 110 and visually exposed outside the electronic device 100. For example, at least a portion of the display 182 may be visually exposed on the front surface 110A of the housing 110 through the front plate 111 formed to be substantially transparent. The display 182 may be formed in a form corresponding to the form of the front plate 111. For example, the display 182 may be formed in various shapes such as a circular shape, an oval shape, or a polygonal shape. The display 182 may be combined with, or disposed adjacent to, touch detection circuitry, a pressure sensor capable of measuring the intensity (pressure) of a touch, and/or a fingerprint sensor.

In an embodiment, the audio module 115 and 116 may include the microphone hole 115 and the speaker hole 116. For example, a microphone for obtaining external sound may be disposed in the microphone hole 115. According to various embodiments of the disclosure, the electronic device 100 may include a plurality of microphones disposed therein for sensing sounds in various directions. A speaker for outputting sound to the outside may be disposed in the speaker hole 116 and may be used as an external speaker and a receiver for telephone call. According to various embodiments of the disclosure, the speaker hole 116 and the microphone hole 115 may be implemented as a single hole. Alternatively, the electronic device 100 may be configured such that a speaker is included without the speaker hole 116 (e.g., a piezoelectric speaker).

In an embodiment, the sensor module (including biosensor modules 117, 118, and 119) may generate an electrical signal or a data value that corresponds to an operational state inside the electronic device 100 or an environmental state external to the electronic device 100. For example, the sensor module (including biosensor modules 117, 118, and 119) may include the biosensor module 117 (e.g., a heart rate monitor (HRM) sensor) disposed on the rear surface 110B of the housing 110. Although not illustrated, according to various embodiments of the disclosure, the electronic device 100 may further include another sensor module, for example, at least one of a gesture sensor, a gyro sensor, an atmospheric pressure sensor, a magnetic sensor, an acceleration sensor, a grip sensor, a color sensor, an infrared (IR) sensor, a biosensor, a temperature sensor, a humidity sensor, or an illuminance sensor.

In an embodiment, the sensor module (including biosensor modules 117, 118, and 119) may include the electrode regions 118 and 119 exposed on the rear surface 110B of the housing 110. The electrode regions 118 and 119 may include the first electrode region 118 and the second electrode region 119, and the sensor module (including biosensor modules 117, 118, and 119) may be configured to obtain an electrical signal from a part of the user's body through the electrode regions 118 and 119 and detect a biometric signal of the user based on the obtained electrical signal.

In an embodiment, the key input devices 120 and 181 may include the wheel member 181 (e.g., a wheel key or a rotary bezel) disposed on the front surface 110A of the housing 110 and rotatable in at least one direction and/or the button members 120 (e.g., side keys) disposed on the side surface 110C of the housing 110.

In an embodiment, the wheel member 181 may have a form (e.g., a circular frame) corresponding to the form of the front plate 111. For example, the wheel member 181 may be rotated by a user operation to receive user inputs for implementing various functions of the electronic device 100. The button members 120 may be rotated and/or pressed by a user operation to receive user inputs for implementing various functions of the electronic device 100. The button members 120 may include a first button member 120a and a second button member 120b. According to various embodiments of the disclosure, at least one of the first button member 120a or the second button member 120b may be configured as an electrode button capable of detecting a biometric signal of the user as a part of the user's body (e.g., a finger) makes contact with the electrode button. The electronic device 100 may not include all or a part of the above-described key input devices 120 and 181, and the key input devices 120 and 181 not included may be implemented in a different form, for example, the form of a soft key on the display 182.

In an embodiment, the electronic device 100 may be detachably worn on a part of the user's body (e.g., a wrist or an ankle) by the fastening member 190. For example, the fastening member 190 may be connected to at least a portion of the housing 110 and may be configured to be detachably fastened in a state of surrounding a part of the user's body. For example, the fastening member 190 may include a first fastening member 190-1 and a second fastening member 190-2 that are coupled to opposite sides of the housing 110, respectively. The first fastening member 190-1 and the second fastening member 190-2 may be connected with or separated from each other.

In an embodiment, the fastening member 190 may be formed in a band or strap form to surround a part of the user's body. For example, the fastening member 190 may be formed of woven fabric, leather, rubber, urethane, metal, ceramic, or a combination of at least two of the aforementioned materials and may be implemented in an integrated form or with a plurality of unit links that are movable relative to each other.

In an embodiment, the fastening member 190 may be detachably connected to the housing 110. For example, the fastening member 190 may be detachably connected to at least a partial region of the housing 110 by locking members 191. According to various embodiments of the disclosure, the electronic device 100 may include various types of fastening members 190, and the fastening members 190 may be replaced depending on the user's taste and/or preference.

In an embodiment, the fastening member 190 may include a fixing member 192, fixing-member fastening holes 193, a band guide member 194, and/or a band fixing ring 195. For example, the fixing member 192 may be configured to fix the housing 110 and the fastening member 190 to a part of the user's body (e.g., a wrist or an ankle). The fixing-member fastening holes 193 may fix the housing 110 and the fastening member 190 to the part of the user's body to correspond to the fixing member 192. The band guide member 194 may be configured to limit a movement range of the fixing member 192 when the fixing member 192 is fastened to one of the fixing-member fastening holes 193. Accordingly, the fastening member 190 may be closely fastened around the part of the user's body. The band fixing ring 195 may limit a movement range of the fastening member 190 in the state in which the fixing member 192 is fastened to one of the fixing-member fastening holes 193.

According to various embodiments of the disclosure, the electronic device 100 may not include at least one component (e.g., the key input devices 120 and 181 or the sensor module (including biosensor modules 117, 118, and 119)) among the components illustrated in FIGS. 1 and 2, or may additionally include other component(s). For example, the electronic device 100 may further include a connector hole (not illustrated). The connector hole (not illustrated) may accommodate a connector (e.g., a USB connector) for transmitting and/or receiving power and/or data with an external electronic device, or may accommodate a connector (e.g., an earphone connector) for transmitting and/or receiving an audio signal with an external electronic device.

Figure 3:
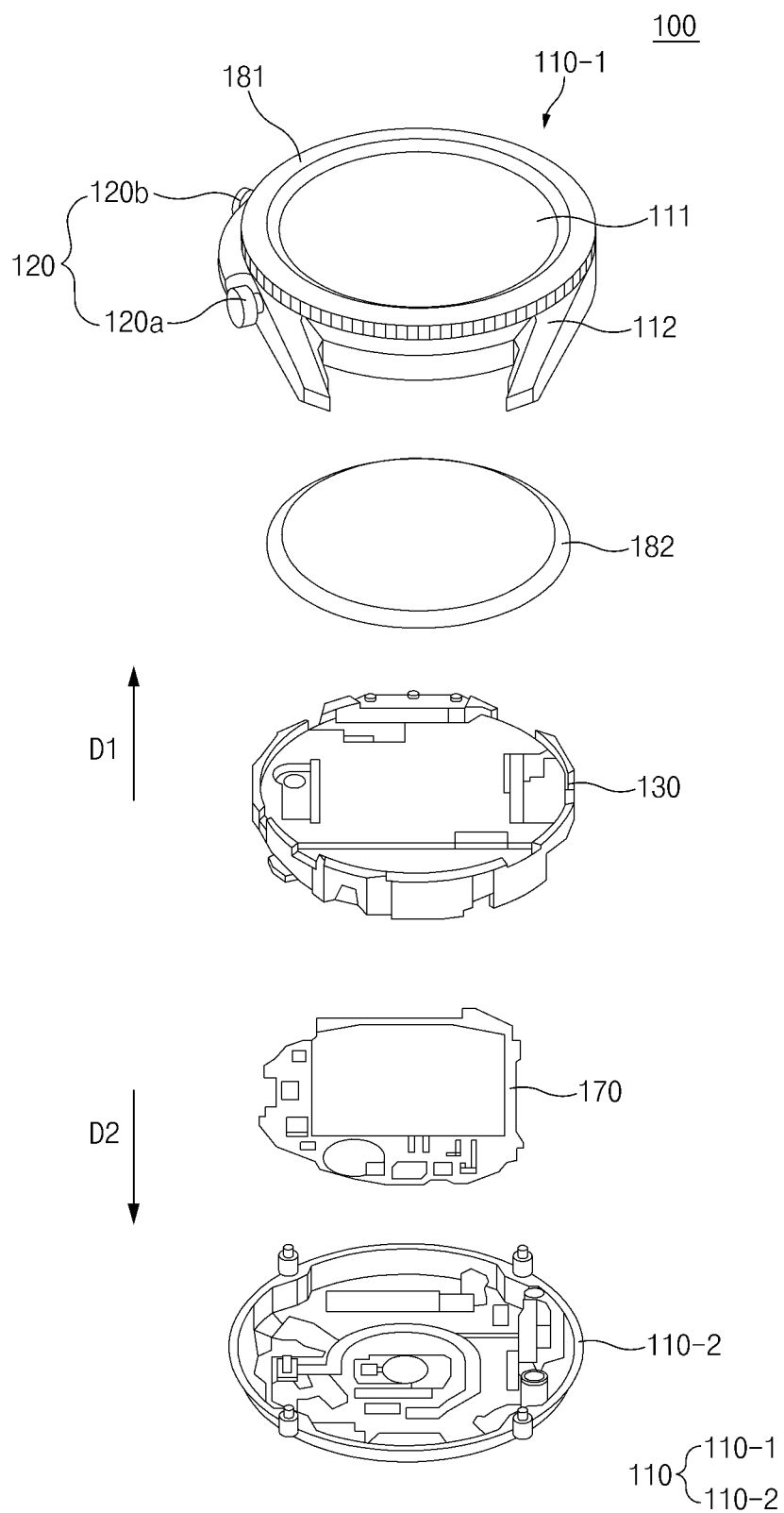
FIG. 3 is an exploded perspective view of the electronic device according to an embodiment of the disclosure.

FIG. 3 is an exploded perspective view of the electronic device according to an embodiment of the disclosure.

Figure 4:
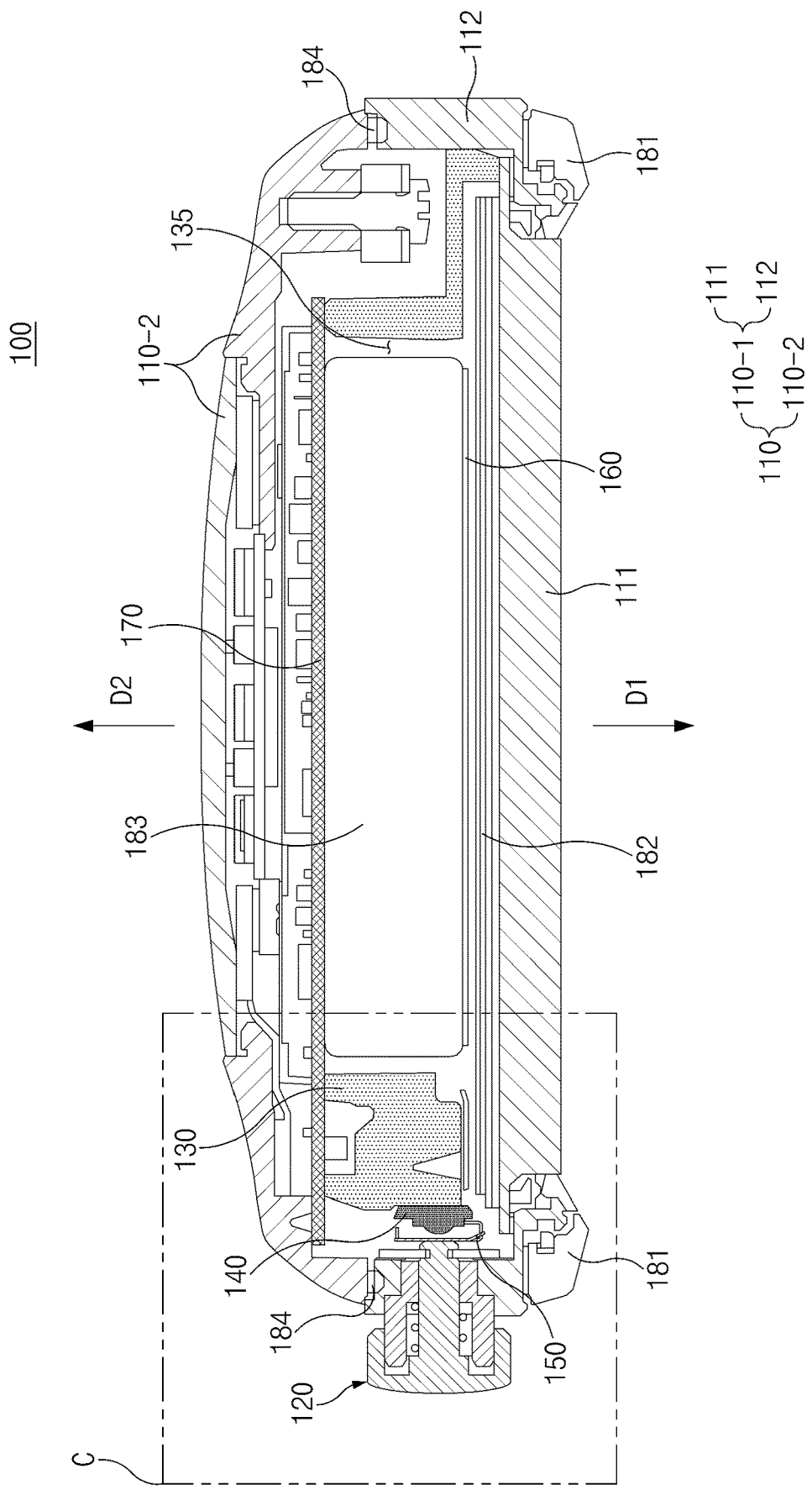
FIG. 4 is a sectional view of the electronic device according to an embodiment of the disclosure.

FIG. 4 is a sectional view of the electronic device according to an embodiment of the disclosure.

FIG. 4 is a view illustrating a section taken along line A-A' of FIG. 1 or a section taken along line B-B' of FIG. 2.

Referring to FIGS. 3 and 4, the electronic device 100 according to an embodiment may include the housing 110, the button members 120, the bracket 130, a connecting member 140, a conductive structure 150, the circuit board 170, the display 182, the battery 183, and a sealing member 184. For example, FIGS. 3 and 4 may be views in which the fastening member (e.g., the fastening member 190 of FIGS. 1 and 2) of the electronic device 100 is omitted. Some of the components of the electronic device 100 illustrated in FIGS. 3 and 4 may be identical or similar to the components of the electronic device 100 illustrated in FIGS. 1 and 2, and repetitive descriptions will hereinafter be omitted.

In an embodiment, the housing 110 may include the front case 110-1 including the front plate 111 and the side frame 112 and the rear case 110-2 coupled with the front case 110-1. For example, the display 182, the bracket 130, the circuit board 170, and the battery 183 may be accommodated in the inner space formed by the front case 110-1 and the rear case 110-2 coupled with each other.

In an embodiment, the front case 110-1 may include the front plate 111 on which the display 182 is disposed and the side frame 112 on which the button members 120 and the wheel member 181 are disposed. The side frame 112 may include an opening region, and the front plate 111 may be exposed through the opening region in a first direction D1. At least a portion of the front plate 111 may be attached or connected to the side frame 112. The front plate 111 may be formed of a transparent material such that the display 182 is visually exposed through the front plate 111. One surface of the rear case 110-2 may be coupled to the side frame 112 so as to face one surface of the front plate 111. The sealing member 184 may be disposed between the rear case 110-2 and the side frame 112. For example, the sealing member 184 may seal a region where the rear case 110-2 and the side frame 112 make contact with each other and thus may block infiltration of foreign matter and/or moisture from outside the housing 110 through a space between the rear case 110-2 and the side frame 112.

In an embodiment, the wheel member 181 may be disposed on the front surface of the housing 110. For example, the wheel member 181 may be formed of a substantially circular frame and may be coupled to the side frame 112 so as to be rotatable relative to the side frame 112. The electronic device 100 may sense and/or detect a rotary motion of the wheel member 181 and may execute various functions of the electronic device 100. For example, the electronic device 100 may be configured to change a screen displayed on the display 182 or adjust volume in a multimedia playback mode in response to rotation of the wheel member 181.

In an embodiment, the button members 120 may be disposed on the side surface of the housing 110. The button members 120 may be used as an input unit for a user input. According to the illustrated embodiment, the button members 120 may include the first button member 120a and the second button member 120b. However, the disclosure is not limited to the illustrated embodiment, and according to various embodiments of the disclosure, the electronic device 100 may not include one of the button members 120, or may additionally include another button member (e.g., a third button member).

In an embodiment, at least one of the button members 120 (e.g., the first button member 120a) may be used as an electrode for detecting biometric information of the user. For example, the button members 120 may include a conductive material (e.g., an electrode member of FIGS. 5 and 6) and may be configured to be electrically connected with the circuit board 170 through other parts disposed in the housing 110, for example, the connecting member 140 and the conductive structure 150. A structure for electrical connection of the button members 120 will be described below in more detail with reference to FIGS. 5 to 7, 8A, and 8B.

In an embodiment, the bracket 130 may be disposed in the housing 110 and may support other components of the electronic device 100 (e.g., the connecting member 140, the conductive structure 150, the circuit board 170, and/or the battery 183). The bracket 130 may be assembled in the front case 110-1 in the first direction D1. The bracket 130 may be surrounded by the side frame 112. For example, the bracket 130 may be connected to the side frame 112, or may be integrally formed with the side frame 112. The bracket 130 may be formed of a metallic material and/or a non-metallic (e.g., polymer) material.

In an embodiment, the bracket 130 may be disposed between the circuit board 170 and the display 182. The bracket 130 may provide a battery receiving space 135 in which the battery 183 is accommodated. For example, the circuit board 170 may be disposed on one surface (e.g., a surface facing a second direction D2) of the bracket 130, and a support plate 160 may be disposed on an opposite surface (e.g., a surface facing the first direction D1) of the bracket 130. One surface of the support plate 160 may be disposed to face one surface of the display 182, and the battery 183 may be located between the circuit board 170 and the support plate 160 and may be stably fixed to the bracket 130 accordingly.

In an embodiment, the circuit board 170 may be seated on the bracket 130. For example, the circuit board 170 may be disposed between the rear case 110-2 and the bracket 130. The circuit board 170 may be disposed to face the rear case 110-2 and may be disposed to face the display 182 with the bracket 130 therebetween. For example, the circuit board 170 may be located on the one surface (e.g., the surface facing the second direction D2) of the bracket 130 and may be disposed in the housing 110 in the state of being spaced apart from the display 182 in the second direction D2.

In an embodiment, electronic parts, such as a processor, a memory, a communication module, various types of sensor modules, an interface, or a connecting terminal, may be located on the circuit board 170. The processor may include, for example, one or more of a central processing unit, an application processor, a graphic processing unit (GPU), a sensor processor, or a communication processor. The memory may include, for example, a volatile memory or a non-volatile memory. The interface may include, for example, a high definition multimedia interface (HDMI), a universal serial bus (USB) interface, a secure digital (SD) card interface, or an audio interface. The interface may electrically or physically connect the electronic device 100 with an external electronic device and may include a USB connector, an SD connector, a multimedia card (MMC) connector, or an audio connector.

In an embodiment, the display 182 may be disposed between the front plate 111 and the bracket 130. The display 182 may be visually exposed through the front plate 111 in a direction (e.g., the first direction D1) toward the front surface of the housing 110. For example, the display 182 may be attached to the front plate 111. The display 182 may be electrically connected to the circuit board 170. For example, the display 182 may be disposed to face the circuit board 170 with the bracket 130 therebetween, and a connector (not illustrated) of the display 182 may be connected to the circuit board 170 through an opening formed in the bracket 130.

In an embodiment, the battery 183 may supply power to at least some of the components of the electronic device 100. For example, the battery 183 may include a primary cell that is not rechargeable, a secondary cell that is rechargeable, or a fuel cell. The battery 183 may be supported by the bracket 130 and may be disposed in the housing 110 accordingly. For example, at least a portion of the battery 183 may be surrounded by the bracket 130 and may be supported by the support plate 160 coupled to the bracket 130. The battery 183 may face the support plate 160 in the first direction D1 and may face the circuit board 170 in the second direction D2. The battery 183 may be accommodated in the battery receiving space 135 formed by the bracket 130, the support plate 160, and the circuit board 170. According to various embodiments of the disclosure, the battery 183 may be integrally disposed inside the electronic device 100, or may be disposed to be detachable from the electronic device 100.

Although not illustrated in FIGS. 3 and 4, the electronic device 100 may further include an antenna (not illustrated) that is provided in the form of a flat plate or a thin film. For example, the antenna may include at least one of a near field communication (NFC) antenna, a wireless charging antenna, or a magnetic secure transmission (MST) antenna. The antenna may be disposed between the display 182 and the bracket 130, or may be disposed between the circuit board 170 and the rear case 110-2. The antenna may perform short-range communication with an external device, or may wirelessly transmit and receive power required for charging, and may transmit a magnetism-based signal including a short-range communication signal or payment data. Furthermore, according to various embodiments of the disclosure, the electronic device 100 may be configured such that at least a portion of the housing 110 functions as an antenna. For example, an antenna structure may be formed by a portion of the side frame 112 and/or a portion of the bracket 130, or a combination thereof.

Figure 5:
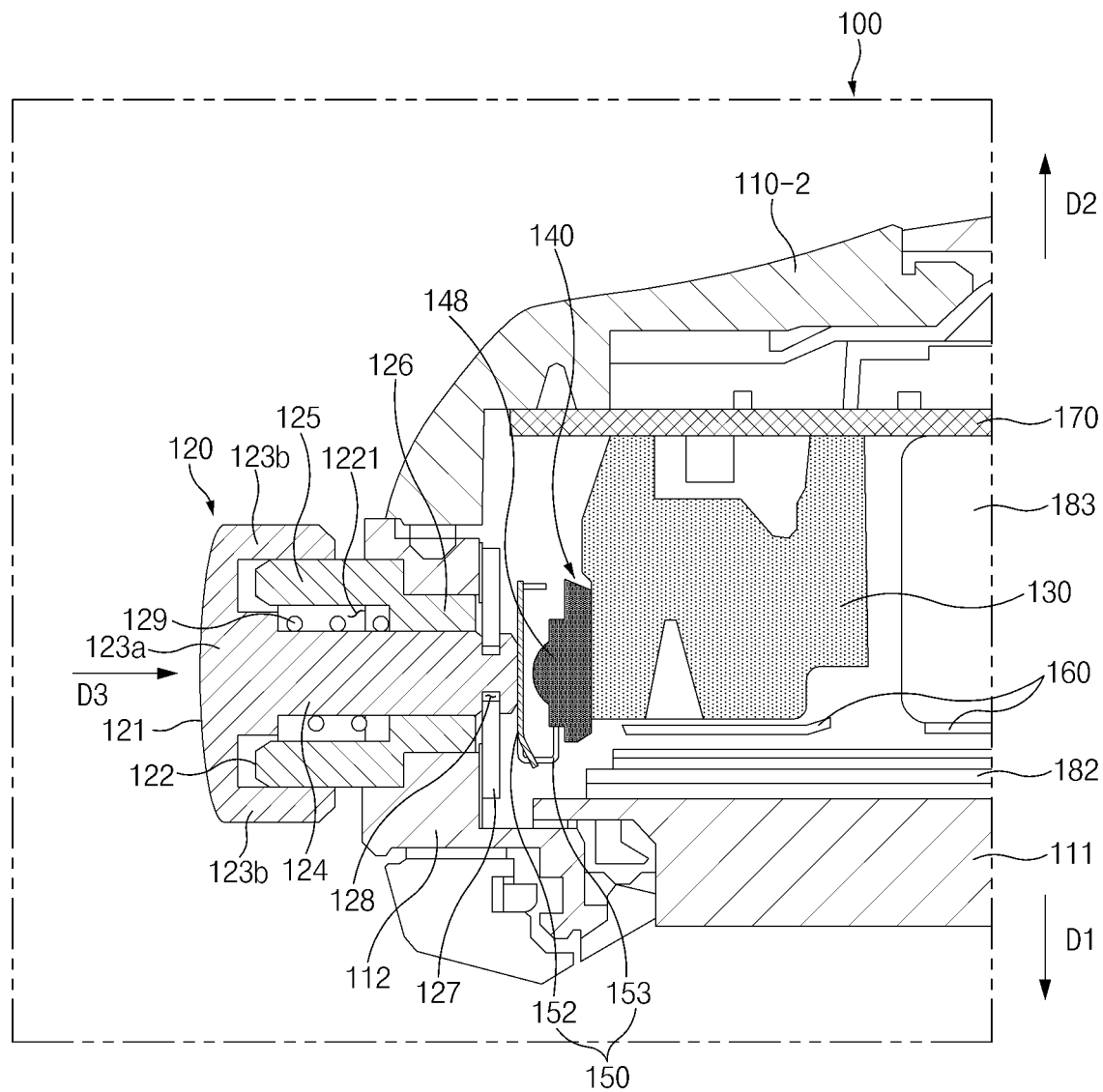
FIG. 5 is a view illustrating a coupling relationship of a button member of the electronic device according to an embodiment of the disclosure.

FIG. 5 is a view illustrating a coupling relationship of the button member of the electronic device according to an embodiment of the disclosure.

Figure 6:
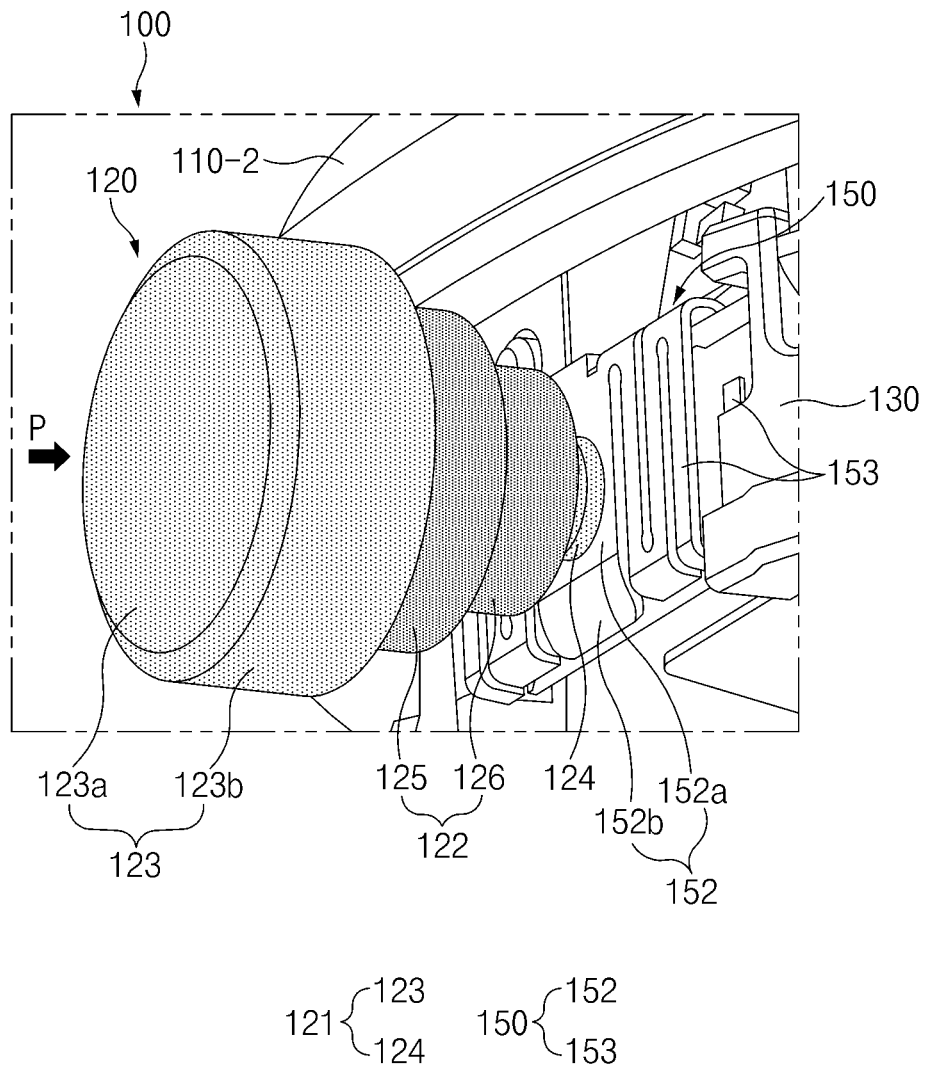
FIG. 6 is a view illustrating the button member and a conductive structure of the electronic device according to an embodiment of the disclosure.

FIG. 6 is a view illustrating the button member and the conductive structure of the electronic device according to an embodiment of the disclosure.

FIG. 5 is an enlarged view illustrating portion C in the sectional view of FIG. 4. FIG. 6 is a view in which the front case is omitted from the rear perspective view of FIG. 2 such that the button member and the conductive structure are illustrated.

Referring to FIGS. 5 and 6, the electronic device 100 according to an embodiment may include the housing 110, the button members 120, the bracket 130, the connecting member 140, the conductive structure 150, the support plate 160, the circuit board 170, the display 182, and the battery 183. Some of the components of the electronic device 100 illustrated in FIGS. 5 and 6 may be identical or similar to the components of the electronic device 100 illustrated in FIGS. 1 to 4, and repetitive descriptions will hereinafter be omitted.

In an embodiment, the housing 110 may include the front plate 111, the side frame 112, and the rear case 110-2 that form the exterior of the electronic device 100. For example, the front plate 111 may form at least a portion of the front surface of the electronic device 100, the rear case 110-2 may form at least a portion of the rear surface of the electronic device 100, and the side frame 112 may form at least a portion of the side surface 110C of the electronic device 100. The side frame 112 may include a button hole (not illustrated) in which the button member 120 is disposed. The button hole may be formed through at least a partial region of the side frame 112. The button hole may be formed in a direction (e.g., a third direction D3) substantially perpendicular to the first direction D1 and/or the second direction D2.

In an embodiment, the button member 120 may be coupled to the housing 110 (e.g., the side frame 112) and may be at least partially exposed outside the housing 110. The button member 120 may be used as an electrode button for detecting a biometric signal of the user. The button member 120 illustrated in FIGS. 5 and 6 may be referred to as the first button member 120a illustrated in FIGS. 1 to 3. However, this is illustrative, and according to various embodiments of the disclosure, the button member 120 illustrated in FIGS. 5 and 6 may include the second button member 120b. For example, a connecting structure illustrated in FIGS. 5 and 6 may be applicable to the second button member 120b of FIGS. 1 to 3.

In an embodiment, the button member 120 may at least partially include a conductive material (e.g., an electrode member 121) to function as an electrode or sensor that detects a biometric signal and may be configured to remain electrically connected with the circuit board 170. For example, the button member 120 may be electrically connected with the circuit board 170 through a connecting structure (e.g., the conductive structure 150 and the connecting member 140) that is directly or indirectly connected and/or brought into contact with the button member 120 and the circuit board 170.

In an embodiment, the button member 120 may be configured to press a switch 148 depending on a push operation P by the user. The button member 120 may operate the switch 148 by moving in a direction toward the switch 148 (e.g., the third direction D3) depending on the push operation P of the user. For example, the button member 120 may press and move at least a portion of the conductive structure 150 (e.g., a contact portion 152 of FIGS. 9A to 9D) in the direction toward the switch 148 (e.g., the third direction D3), and the portion of the conductive structure 150 pressed by the button member 120 may press the switch 148.

In an embodiment, the button member 120 may include the electrode member 121, a support member 122 surrounding at least a portion of the electrode member 121 to support the electrode member 121, and a fixing member 127 coupled to at least a portion of the electrode member 121.

In an embodiment, at least a portion of the electrode member 121 may be exposed on the side surface of the housing 110 so as to make contact with a part of the user's body (e.g., a finger). The electrode member 121 may be formed of a conductive material. The electrode member 121 may be configured to receive an electrical signal from the user's body and transfer the received electrical signal to control circuitry (or, the processor) (e.g., a micro controller unit 210 of FIG. 12) disposed on the circuit board 170.

In an embodiment, the electrode member 121 may extend from the outside of the housing 110 to the inside of the housing 110 through the button hole (not illustrated) that is formed through at least a partial region of the housing 110 (e.g., the side frame 112). The electrode member 121 may include a head portion 123 and a rod portion 124 extending from the head portion 123 toward the inside of the housing 110. For example, the head portion 123 may be a portion that is exposed outside the housing 110 and with which the user's body is substantially brought into contact. The rod portion 124 may pass through a through-hole 1221 of the support member 122 and may extend into the housing 110, and at least part of the rod portion 124 may be disposed in the through-hole 1221. The electrode member 121 may be electrically connected with the circuit board 170 as one end of the rod portion 124 disposed in the housing 110 is brought into contact with the conductive structure 150.

In an embodiment, the head portion 123 may include a central portion 123a from which the rod portion 124 extends and a sidewall portion 123b extending from the periphery of the central portion 123a so as to be spaced apart from the rod portion 124. For example, the sidewall portion 123b may extend to have a smaller length than the rod portion 124, and a space in which at least a portion of the support member 122 is disposed may be formed between the sidewall portion 123b and the rod portion 124. According to an embodiment, the central portion 123a of the electrode member 121 and one end portion of the support member 122 (e.g., an end portion of a first portion 125) may be spaced apart from each other. Accordingly, a space by which the electrode member 121 is movable relative to the support member 122 may be provided. For example, when the user presses the electrode member 121, the electrode member 121 may move relative to the support member 122, and the central portion 123a and the support member 122 may make contact with each other accordingly. According to various embodiments of the disclosure, the electrode member 121 may be coupled so as to be rotatable relative to the support member 122. For example, the electrode member 121 may be configured to rotate relative to the support member 122 by a user operation.

In an embodiment, the rod portion 124 may include a fixing groove 128 for preventing separation of the electrode member 121 from the housing 110. For example, the fixing groove 128 may be concavely formed on a region of the outer circumferential surface of the rod portion 124 and may be coupled with the fixing member 127 to limit separation of the electrode member 121 from the housing 110. The fixing groove 128 may be formed on part of the rod portion 124 that is located in the housing 110. The fixing groove 128 may be concavely formed on the outer circumferential surface of the rod portion 124.

In an embodiment, the support member 122 may support the electrode member 121 such that the electrode member 121 is disposed on the side surface of the housing 110. For example, at least a portion of the support member 122 may be inserted into the button hole (not illustrated) of the housing 110, and the support member 122 may include the through-hole 1221 into which at least a portion of the electrode member 121 is inserted. The support member 122 may be disposed between the electrode member 121 and the housing 110 (e.g., the side frame 112) and may insulate the electrode member 121 from the housing 110. For example, the support member 122 may at least partially include an electrical insulating material.

In an embodiment, the support member 122 may surround the rod portion 124 of the electrode member 121, and at least a portion of the support member 122 may be formed to be surrounded by the head portion 123 of the electrode member 121. The support member 122 may include the first portion 125 and a second portion 126 through which through-holes 1221 having different sizes are formed. For example, a first through-hole may be formed through the first portion 125, and a second through-hole having a smaller size than the first through-hole may be formed through the second portion 126. Part of the first portion 125 and the second portion 126 may be disposed in the button hole (not illustrated) and may make contact with the inner wall of the button hole. The rod portion 124 may be disposed in the first portion 125 and the second portion 126. At least part of the first portion 125 may be disposed in the space between the rod portion 124 and the sidewall portion 123b of the electrode member 121, and an elastic member 129 may be disposed between the inside surface of the first portion 125 and the outside surface of the rod portion 124.

In an embodiment, the fixing member 127 may be coupled to the fixing groove 128 of the electrode member 121. For example, the fixing member 127 may be supported on the inner wall of the side frame 112 in the state of being coupled to the fixing groove 128. The fixing member 127 may be coupled to the fixing groove 128 of the electrode member 121 in the state in which the electrode member 121 and the support member 122 are inserted into the button hole, and the electrode member 121 may be constrained so as not to be separated from the housing 110. According to various embodiments of the disclosure, the fixing member 127 may be formed in a ring shape that is open at one side. For example, the fixing member 127 may include a C-ring or an E-ring.

In an embodiment, the fixing member 127 may be formed of a conductive material. In the case in which the fixing member 127 is formed of a conductive material, an insulating member (not illustrated) may be disposed between the inner wall of the side frame 112 and the fixing member 127. The insulating member may insulate the electrode member 121 from the housing 110. However, without being limited to a conductive material, the fixing member 127 may be formed of an insulating material. In the case in which the fixing member 127 is formed of an insulating material, the insulating member may be omitted.

In an embodiment, the elastic member 129 may be disposed between the electrode member 121 and the support member 122. For example, the elastic member 129 may be disposed between the rod portion 124 of the electrode member 121 and the first portion 125 of the support member 122. In a state of surrounding at least a portion of the outer circumferential surface of the rod portion 124, the elastic member 129 may be disposed such that one end portion is supported by the support member 122 and an opposite end portion is supported by the electrode member 121.

In an embodiment, the elastic member 129 may be configured to apply an elastic force toward the electrode member 121 to allow the operation P of pressing the button member 120. The electrode member 121 may move relative to the support member 122 in both directions as the electrode member 121 is pressed or released by the user. For example, when the electrode member 121 is pressed in the pressing direction P (or, the third direction D3), the electrode member 121 may move relative to the support member 122 in the third direction D3 (e.g., a direction toward the inside of the housing 110 or a direction toward the switch 148), and the elastic member 129 may be compressed. Furthermore, when the pressing of the electrode member 121 is released, the compressed elastic member 129 may apply an elastic force to the electrode member 121 in the direction opposite to the third direction D3 (e.g., a direction toward the outside of the housing 110 or a direction away from the switch 148), and the electrode member 121 may be moved by the elastic force to return to the position before the pressing.

In an embodiment, the bracket 130 may support the connecting member 140, the conductive structure 150, and the circuit board 170. The bracket 130 may be disposed in the housing 110, and a side surface of the bracket 130 may be disposed to face the inner wall of the side frame 112. At least a portion of the conductive structure 150 and at least a portion of the connecting member 140 may be disposed on the side surface of the bracket 130. For example, the bracket 130 may include a region (e.g., a seating region 131 of FIG. 7) on which the connecting member 140 is disposed, and the conductive structure 150 may be disposed on at least a portion of the connecting member 140 (e.g., a first portion 141 of FIG. 7).

In an embodiment, the bracket 130 may be configured to support an electrical connecting structure of the button member 120 and the circuit board 170. The conductive structure 150 and the connecting member 140 may be at least partially disposed between the bracket 130 and the button member 120 (e.g., one end portion of the electrode member 121). The electrode member 121 may be electrically connected with the circuit board 170 through the conductive structure 150 and the connecting member 140 that are disposed on the bracket 130. For example, the electrode member 121 may be electrically connected with the conductive structure 150 by making contact with the conductive structure 150. The conductive structure 150 may be electrically connected with the circuit board 170 as different portions of the connecting member 140 are directly connected and/or brought into contact with the circuit board 170 and the conductive structure 150. A connecting structure between the conductive structure 150, the connecting member 140, and the circuit board 170 will be described below in more detail with reference to FIGS. 7, 8A, 8B, and 9A to 9D.

In an embodiment, the conductive structure 150 may electrically connect the button member 120 and the connecting member 140. For example, the conductive structure 150 may be disposed on a portion of the connecting member 140 (e.g., the first portion 141 of the connecting member 140 of FIG. 7) and may make contact with the electrode member 121 of the button member 120. The conductive structure 150 may be electrically connected to the electrode member 121 and the connecting member 140. In the electronic device 100 according to an embodiment, the conductive structure 150 and the electrode member 121 may be configured to remain brought into contact with each other, and thus an electrical connecting structure of the electrode member 121 and the circuit board 179 may be implemented. Accordingly, when the user's body touches the electrode member 121, an electrical signal generated from the user's body may be transferred through the electrode member 121 to an electronic part located on the circuit board 170 (e.g., the processor, or the micro controller unit 210 of FIG. 12).

In an embodiment, the conductive structure 150 may be configured such that when the user presses the electrode member 121, at least a portion (e.g., the contact portion 152) of the conductive structure 150 is moved by the electrode member 121 to press the switch 148. The switch 148 may be disposed on a portion of the connecting member 140 (e.g., the first portion 141 of the connecting member 140 of FIG. 7), and the conductive structure 150 may be disposed on the portion of the connecting member 140 to at least partially overlap the switch 148. The conductive structure 150 and the switch 148 may be aligned in a direction substantially parallel to the pressing direction P of the electrode member 121 (e.g., the third direction D3). For example, when the conductive structure 150 is viewed in the third direction D3, the conductive structure 150 may be disposed to hide at least a portion of the switch 148. In response to an operation in which the user presses the electrode member 121, the contact portion 152 of the conductive structure 150 may move in a direction toward the switch 148 (e.g., the third direction D3) to press the switch 148.

In an embodiment, the conductive structure 150 may include the contact portion 152 at least partially making contact with the electrode member 121 and a fixed portion 153 extending from the contact portion 152. The contact portion 152 may be formed such that at least part of the contact portion 152 has a shape bent toward the connecting member 140 or the switch 148. For example, the contact portion 152 may include a flat region 152a and a curved region 152b extending from the flat region 152a, and the curved region 152b may be formed in a shape bent toward the switch 148 and/or the connecting member 140 along the front direction of the electronic device 100 (e.g., the first direction D1).

In an embodiment, the conductive structure 150 may be configured such that the contact portion 152 is spaced apart from the connecting member 140. For example, the contact portion 152 may be spaced apart from the connecting member 140 so as to press the switch 148 while moving in a direction toward the switch 148 (or, the connecting member 140) (e.g., the third direction D3). The conductive structure 150 may be configured such that the contact portion 152 and the connecting member 140 are spaced apart from each other by the fixed portion 153. For example, the fixed portion 153 may extend from the contact portion 152 toward the connecting member 140 to space the contact portion 152 and the connecting member 140 apart from each other.

Through the above-described shape of the contact portion 152, the electronic device 100 according to an embodiment of the disclosure may implement a structure in which when the electronic device 100 is assembled, the conductive structure 150 moves in a direction (e.g., the first direction D1) perpendicular to the button member 120 and remains brought into contact with the button member 120. The shape of the conductive structure 150 according to an embodiment will be described below in detail with reference to FIGS. 9A to 9D, and a process in which the electronic device 100 is assembled to correspond to the shape of the conductive structure 150 will be described below with reference to FIGS. 10, 11A, and 11B.

Figure 7:
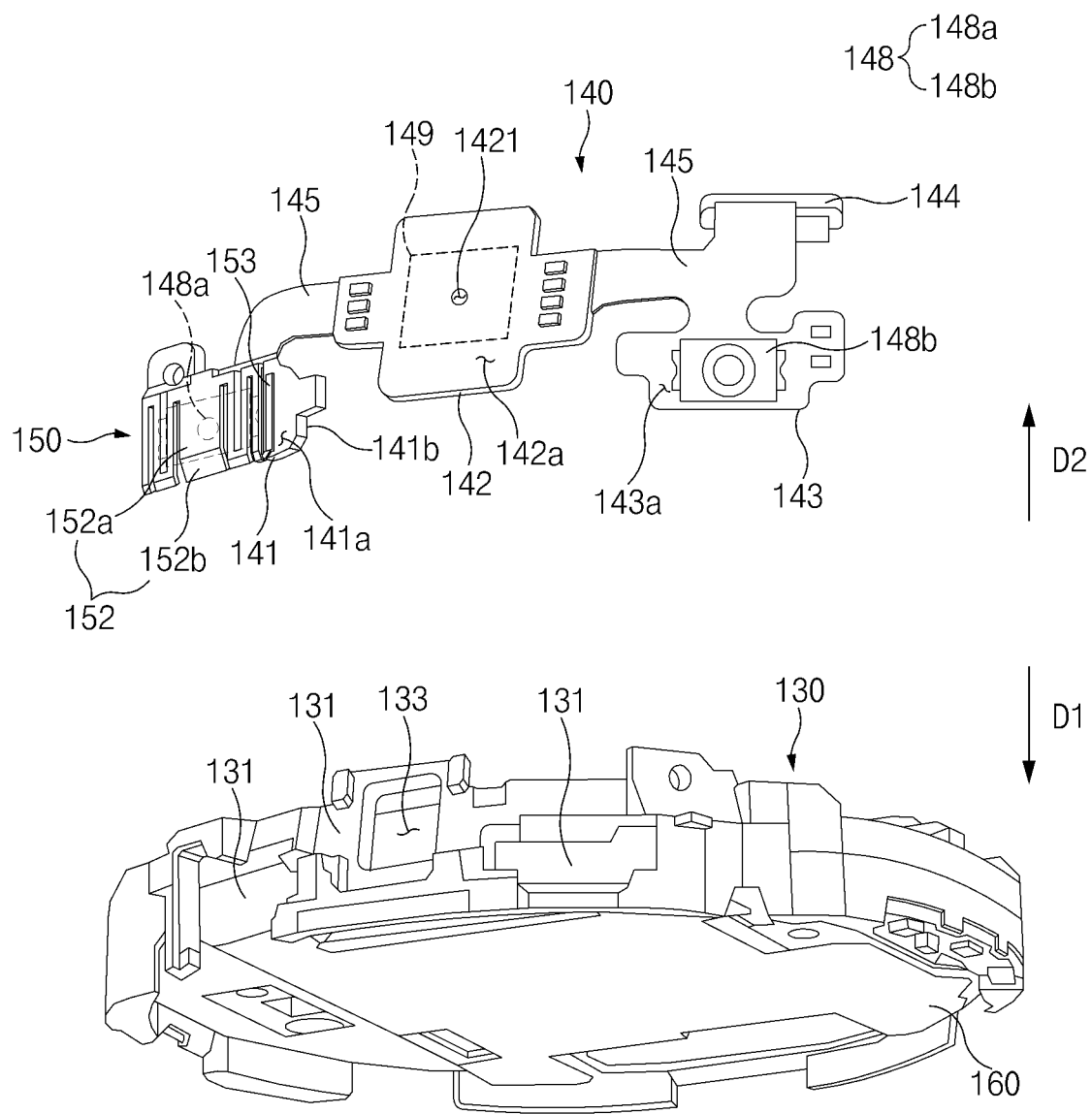
FIG. 7 is a view illustrating a bracket and a connecting member of the electronic device according to an embodiment of the disclosure.

FIG. 7 is a view illustrating the bracket and the connecting member of the electronic device according to an embodiment of the disclosure.

Figure 8A:
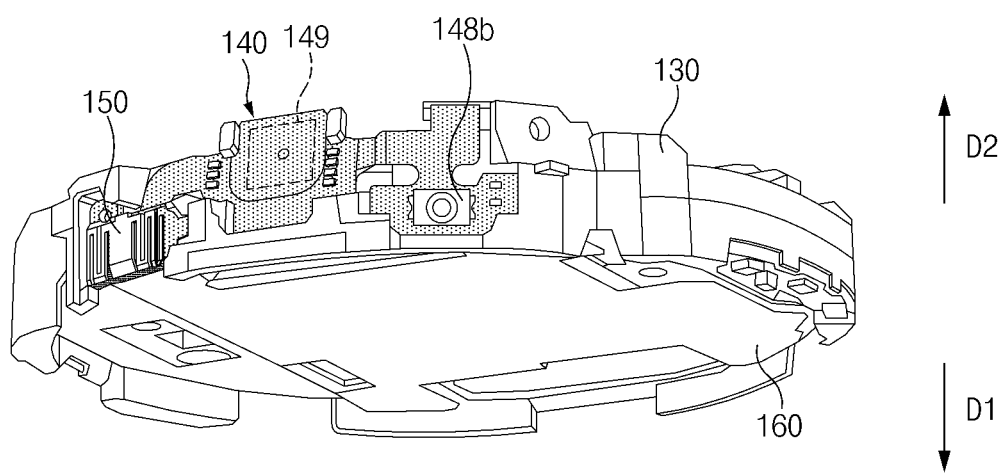
FIG. 8A is a view illustrating the bracket and the connecting member of the electronic device according to an embodiment of the disclosure.
Figure 8B:
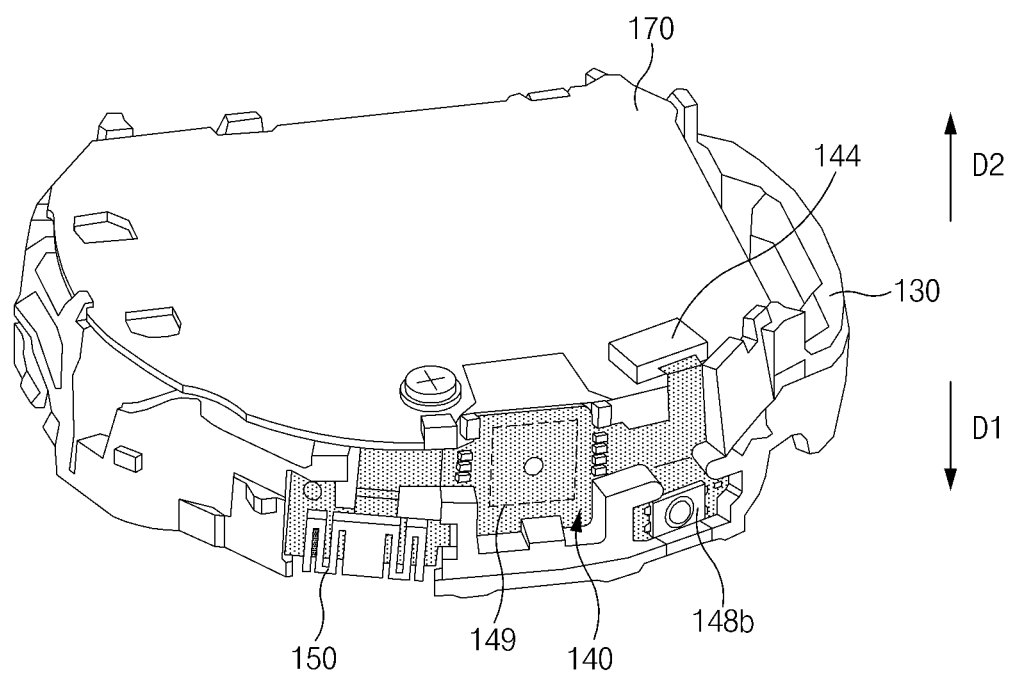
FIG. 8B is a view illustrating the bracket and the connecting member of the electronic device according to an embodiment of the disclosure.

FIGS. 8A and 8B are views illustrating the bracket and the connecting member of the electronic device according to various embodiments of the disclosure.

FIG. 7 may be a view illustrating a state in which the connecting member and the bracket are separated from each other. FIGS. 8A and 8B may be a view illustrating a state in which the connecting member is coupled to the bracket.

Referring to FIGS. 7, 8A, and 8B, the electronic device according to various embodiments (e.g., the electronic device 100 of FIGS. 1 to 6) may include the bracket 130 disposed in the housing (e.g., the housing 110 of FIGS. 1 to 5), the connecting member 140 disposed on the side surface of the bracket 130, the circuit board 170 connected with at least a portion of the connecting member 140 and seated on one surface (e.g., a surface facing the second direction D2) of the bracket 130, and the conductive structure 150 disposed on a portion (e.g., the first portion 141) of the connecting member 140.

In an embodiment, the bracket 130 may support the connecting member 140 and the circuit board 170. For example, the connecting member 140 and the circuit board 170 may be disposed on the bracket 130. The bracket 130 may be formed in a shape substantially corresponding to the shape of the housing 110 of the electronic device 100. For example, the bracket 130 may be formed in a substantially circular frame shape. However, without being limited to the illustrated shape, the bracket 130 may be modified according to various embodiments of the disclosure. The electronic device according to an embodiment (e.g., the electronic device 100 of FIGS. 1 to 6) may be configured such that the connecting member 140, the circuit board 170, and the support plate 160 are disposed on the bracket 130 to form an inner structure and the inner structure is assembled in the housing (e.g., the housing 110 of FIGS. 1 to 5) to fix the connecting member 140, the circuit board 170, and the support plate 160 in the housing 110 (e.g., refer to FIGS. 10, 11A, and 11B).

In an embodiment, the circuit board 170 may be disposed on one surface (e.g., a surface facing the second direction D2) of the bracket 130, and the support plate 160 may be disposed on an opposite surface (e.g., a surface facing the first direction D1) of the bracket 130 that faces away from the one surface. As described above, the battery (e.g., the battery 183 of FIG. 4) may be disposed between the circuit board 170 and the support plate 160 (e.g., refer to FIG. 4). The connecting member 140 may be disposed on the side surface of the bracket 130. For example, the seating region 131 on which the connecting member 140 is seated may be formed on at least a partial region of the side surface of the bracket 130. The seating region 131 may be formed in a shape corresponding to the connecting member 140.

In an embodiment, the connecting member 140 may be seated on the seating region 131 of the bracket 130. The connecting member 140 may adhere to the seating region 131 of the bracket 130. For example, at least a partial region of the connecting member 140 (e.g., a second surface 141*b* of the first portion 141, a fourth surface (not illustrated) of a second portion 142, and/or a sixth surface (not illustrated) of a third portion 143) may be disposed to face the seating region 131, and an adhesive member (e.g., a double-sided tape) may be disposed between the partial region of the connecting member 140 and at least a portion of the seating region 131. A method of fixing the connecting member 140 is not limited to the adhesion, and according to various embodiments of the disclosure, the connecting member 140 may be fitted into the seating region 131, or may be coupled to the seating region 131 based on a fixing member (e.g., a screw).

In an embodiment, the connecting member 140 may electrically connect the conductive structure 150 and the circuit board 170. The connecting member 140 may be electrically connected with the circuit board 170 and the conductive structure 150. For example, the conductive structure 150 may be disposed to be electrically connected to the first portion 141 of the connecting member 140, and a connector 144 of the connecting member 140 may be connected to the circuit board 170. Accordingly, the conductive structure 150 and the circuit board 170 may be electrically connected through the connecting member 140. In an embodiment, the conductive structure 150 may be surface mounted on the first portion 141 of the connecting member 140 (e.g., surface mount technology (SMT) or surface mount device (SMD)).

In an embodiment, the connecting member 140 may partially include a conductive material to electrically connect the conductive structure 150 and the circuit board 170. For example, the connecting member 140 may include a printed circuit board (PCB), a flexible PCB (FPCB), or a rigid-flexible PCB (RFPCB), or may be formed by a combination thereof.

In an embodiment, the connecting member 140 may be configured such that different parts (e.g., the conductive structure 150, the switch 148, and/or a microphone 149) of the electronic device 100 are disposed on different portions of the connecting member 140.

In an embodiment, the connecting member 140 may include the first portion 141 on which a first switch 148*a* and the conductive structure 150 are disposed, the second portion 142 that extends from the first portion 141 and on which the microphone 149 is disposed, the third portion that extends from the second portion 142 in one direction and on which a second switch 148*b* is disposed, and the connector 144 that extends from the second portion 142 in an opposite direction and that is connected with the circuit board 170. For example, the direction in which the connector 144 extends from the second portion 142 may be substantially opposite to the direction in which the third portion 143 extends from the second portion 142.

In an embodiment, the connecting member 140 may further include a plurality of connecting portions 145 disposed between the first portion 141 and the second portion 142, between the second portion 142 and the third portion 143, and between the second portion 142 and the connector 144 to connect the first portion 141, the second portion 142, and the third portion 143. For example, in a case in which the connecting member 140 is constituted by a rigid-flexible PCB (RFPCB), the first portion 141, the second portion 142, and the third portion 143 on which parts are disposed may be formed of a rigid PCB, and the plurality of connecting portions 145 may be formed of a flexible PCB. However, this is illustrative, and the material of the connecting member 140 is not limited to the described contents.

In an embodiment, the first portion 141 of the connecting member 140 may include a first surface 141*a* on which the first switch 148*a* and the conductive structure 150 are disposed and the second surface 141*b* facing away from the first surface 141*a*. The second portion 142 of the connecting member 140 may include a third surface 142*a* facing substantially the same direction as the first surface 141a and the fourth surface (not illustrated) that faces away from the third surface 142a. The microphone 149 may be disposed on the fourth surface (not illustrated) of the second portion 142. The third portion 143 of the connecting member 140 may include a fifth surface 143a facing substantially the same direction as the first surface 141a and/or the third surface 142a and the sixth surface (not illustrated) that faces away from the fifth surface 143a. The second switch 148b may be disposed on the fifth surface 143a of the third portion 143. For example, the second surface 141b of the first portion 141, the fourth surface (not illustrated) of the second portion 142, and the sixth surface (not illustrated) of the third portion 143 may face the seating region 131 of the bracket 130 when the connecting member 140 is seated on the bracket 130.

In an embodiment, the first switch 148a and the second switch 148b may be pressed by the button members (e.g., the button members 120 of FIGS. 1 to 6) to generate electrical signals for input operations of the button members 120. For example, the first switch 148a may be pressed by the first button member (e.g., the first button member 120a of FIGS. 1 to 3), and the second switch 148b may be pressed by the second button member (e.g., the second button member 120b of FIGS. 1 to 3). The first switch 148a and the second switch 148b may include an elastic material and may be elastically deformed in a predetermined shape when pressed or released by the button members 120. For example, the first switch 148a and the second switch 148b may include a dome switch and may be surface mounted (SMT or SMD) on the first surface 141a of the first portion 141 and the third surface 142a of the third portion 143. According to various embodiments of the disclosure, the first switch 148a and the second switch 148b may be replaced with another type of switch (e.g., a tact switch) that is operated by the button member 120 to generate an electrical signal. Furthermore, in various embodiments, the first switch 148a and the second switch 148b may be formed of an insulating material.

In an embodiment, the first switch 148a may be disposed to at least partially overlap the conductive structure 150 when the first surface 141a of the first portion 141 is viewed from above. The first switch 148a may be configured to be pressed by the conductive structure 150 (e.g., the contact portion 152 of the conductive structure 150) when the user presses the first button member 120a. For example, the first switch 148a may at least partially overlap the conductive structure 150 when the first surface 141a of the first portion 141 is viewed from above (e.g., when viewed in the third direction D3 of FIG. 5) and may be hidden by the conductive structure 150 (e.g., refer to FIG. 5).

In an embodiment, the microphone 149 may be disposed on the fourth surface (not illustrated) of the second portion 142. The microphone 149 may be disposed between the fourth surface (not illustrated) and the bracket 130 when the connecting member 140 is seated on the bracket 130 and thus may not be exposed to the outside. For example, the microphone 149 may be accommodated in a microphone receiving space 133 formed in the seating region 131 of the bracket 130. The second portion 142 of the connecting member 140 may include an opening 1421 that penetrates partial regions of the third surface 142a and the fourth surface (not illustrated) and through which sound is transferred to the microphone 149. For example, the opening 1421 may be aligned with the microphone hole (e.g., the microphone hole 115 of FIG. 1) formed in the housing 110 (e.g., the housing 110 of FIG. 1) and may receive sound from outside the housing 110.

In an embodiment, the conductive structure 150 may be disposed on the first portion 141 of the connecting member 140 such that the curved region 152b faces the first direction D1. The conductive structure 150 may be configured such that the contact portion 152 is spaced apart from the first surface 141a when at least part of the fixed portion 153 (e.g., a second extending portion 153-2 of FIGS. 9A to 9D) is fixed to the first surface 141a of the first portion 141.

FIGS. 9A, 9B, 9C, and 9D are views illustrating the conductive structure of the electronic device according to various embodiments of the disclosure.

Figure 9A:
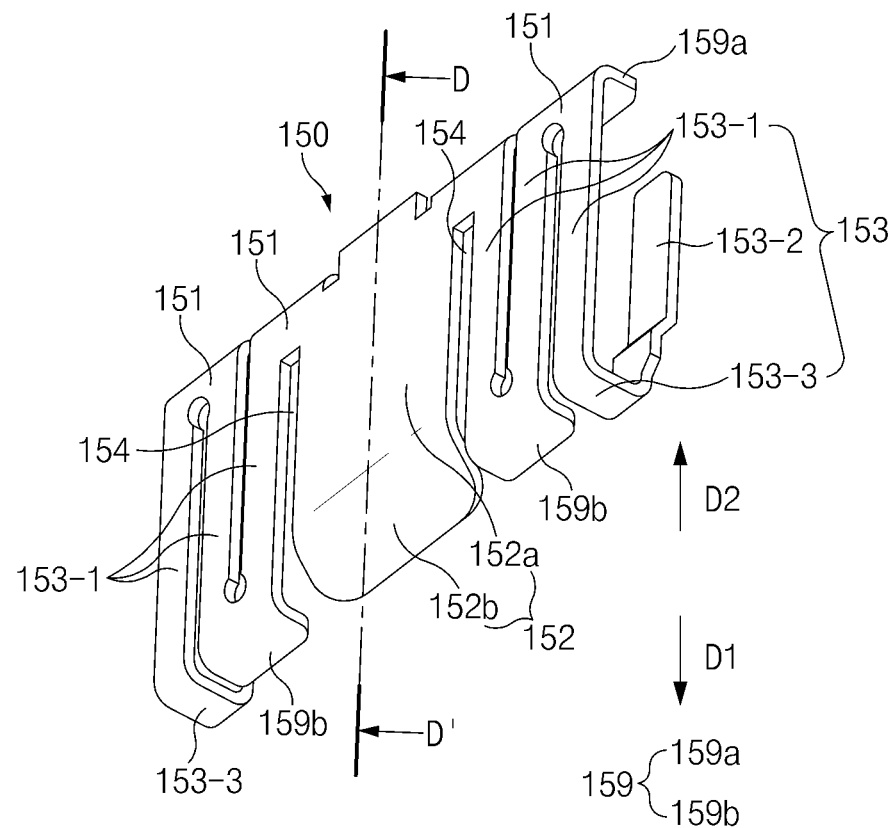
FIG. 9A is a view illustrating the conductive structure of the electronic device according to an embodiment of the disclosure.
Figure 9B:
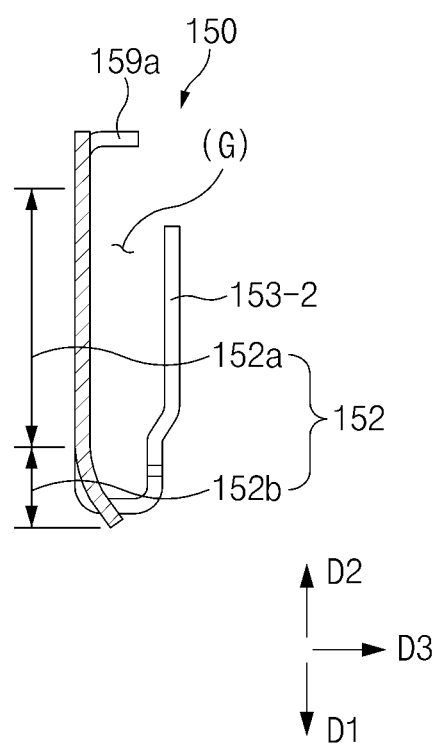
FIG. 9B is a view illustrating the conductive structure of the electronic device according to an embodiment of the disclosure.
Figure 9C:
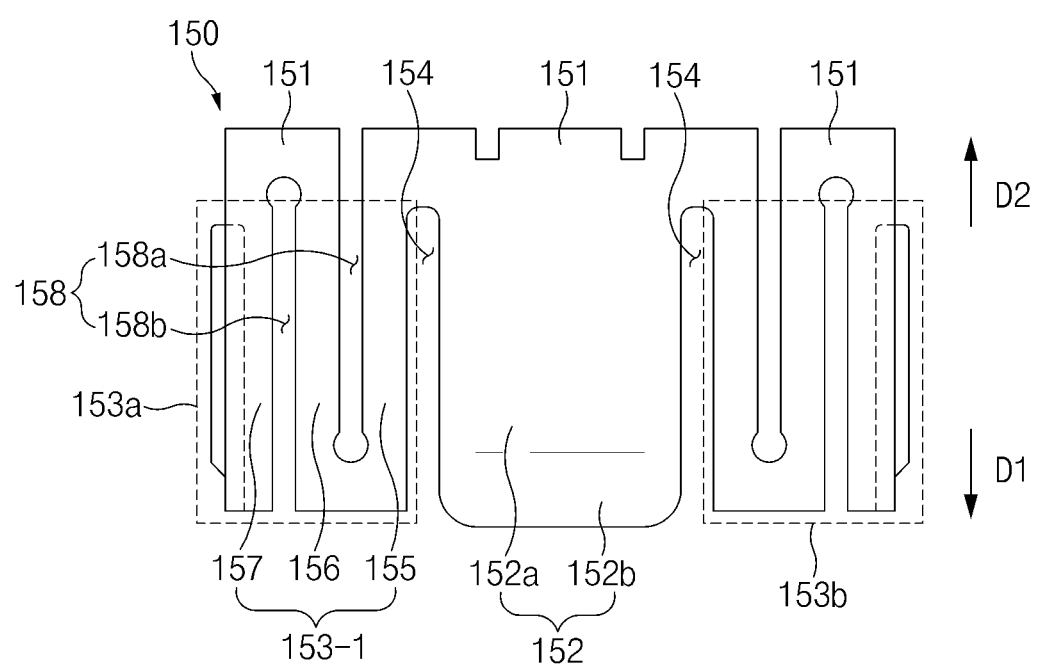
FIG. 9C is a view illustrating the conductive structure of the electronic device according to an embodiment of the disclosure.
Figure 9D:
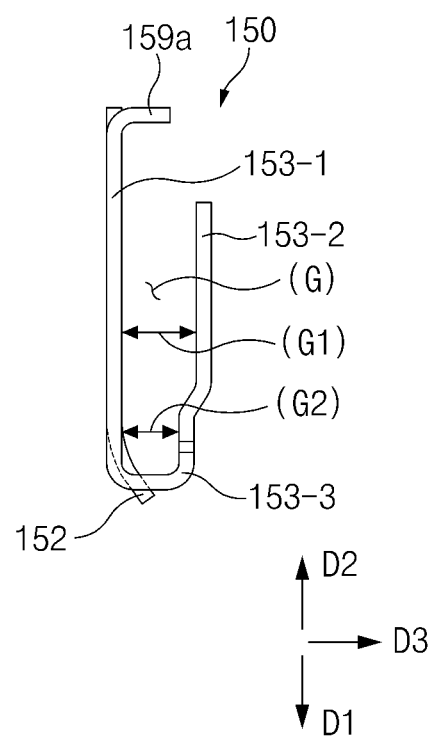
FIG. 9D is a view illustrating the conductive structure of the electronic device according to an embodiment of the disclosure.

FIG. 9A may be a perspective view of the conductive structure. FIG. 9B may be a sectional view of the conductive structure taken along line D-D'. FIG. 9C may be a front view of the conductive structure. FIG. 9D may be a side view of the conductive structure.

Referring to FIGS. 9A, 9B, 9C, and 9D the conductive structure 150 of the electronic device according to an embodiment (e.g., the electronic device 100 of FIGS. 1 to 6) may be formed to have an at least partially curved shape. Furthermore, the conductive structure 150 may be configured such that the shape of the conductive structure 150 is partially deformed as one portion (e.g., the contact portion 152) of the conductive structure 150 is formed to be movable relative to another portion (e.g., the fixed portion 153).

In an embodiment, the conductive structure 150 may include a base portion 151, and the contact portion 152 and the fixed portion 153 that extend from different parts of the base portion 151. For example, the contact portion 152 may extend from a central region of the base portion 151, and the fixed portion 153 may extend from edge regions of the base portion 151 so as to be located on opposite sides of the contact portion 152. The contact portion 152 and the fixed portion 153 may extend from the base portion 151 in the first direction D1.

According to the embodiment illustrated in FIGS. 9A to 9D, the first direction D1, the second direction D2, and the third direction D3 may be substantially the same directions as the directions described above with reference to FIGS. 3 to 6 and 8. For example, the first direction D1 may mean a direction toward the front surface of the electronic device 100 (e.g., the front surface 110A of the housing 110 of FIG. 1) or a direction toward the front plate (e.g., the front plate 111 of FIGS. 3 to 5). The second direction D2, which is opposite to the first direction D1, may mean a direction toward the rear surface of the electronic device 100 (e.g., the rear surface 110B of the housing 110 of FIG. 2) or a direction toward the rear case (e.g., the rear case 110-2 of FIGS. 3 to 5). The third direction D3, which is substantially perpendicular to the first direction D1 and/or the second direction D2, may mean a direction toward the bracket (e.g., the bracket 130 of FIGS. 3 to 7, 8A, and 8B) or a direction in which the electrode member 121 is pressed by the user (e.g., the pressing direction P of FIG. 5).

In an embodiment, the contact portion 152 may at least partially make contact with the electrode member (e.g., the electrode member 121 of FIGS. 5 and 6) of the button member (e.g., the button member of FIGS. 5 and 6). The contact portion 152 may include the flat region 152a extending from the base portion 151 in the first direction D1 and making contact with one end portion of the electrode member 121 and the curved region 152b extending from the flat region 152a in the first direction D1. The curved region 152b may mean a region that curvedly extends from the flat region 152a. For example, the curved region 152b may be formed in a shape bent from the flat region 152a in the third direction D3 substantially perpendicular to the first direction D1. For example, the curved region 152b may be formed in a shape bent toward the bracket (e.g., the bracket 130 of FIGS. 5 to 7, 8A, and 8B) and/or the connecting member (e.g., the connecting member 140 of FIGS. 5 to 7, 8A, and 8B) along the first direction D1 (e.g., refer to FIGS. 5 to 7).

In an embodiment, the contact portion 152 may be configured to move relative to the fixed portion 153 and press the switch (e.g., the switch 148 of FIGS. 5 and 6 or the first switch 148a of FIG. 7). For example, the contact portion 152 may move relative to the fixed portion in a direction toward or away from the switch 148 or 148a or the connecting member (e.g., the connecting member 140 of FIGS. 5 to 7, 8A, and 8B).

In an embodiment, the conductive structure 150 may include an elastic groove 154 formed between the contact portion 152 and the fixed portion 153. For example, the elastic groove 154 may mean a cut-out region formed between the contact portion 152 and the fixed portion 153. The elastic groove 154 may extend from at least a partial region of the base portion 151 in the first direction D1. The contact portion 152 may be movable relative to the fixed portion 153 in the third direction D3 or the direction opposite to the third direction D3 by the elastic groove 154. When the contact portion 152 is pressed in the third direction D3, the contact portion 152 may move relative to the fixed portion 153 in the third direction D3 in a state in which one end portion is constrained to the base portion 151. When the pressing of the contact portion 152 is released, the contact portion 152 may move relative to the fixed portion 153 in the direction opposite to the third direction D3 and may return to the state before the pressing of the contact portion 152. For example, movement of the contact portion 152 in the third direction D3 or the direction opposite to the third direction D3 may be construed as partial elastic deformation of the conductive structure 150 by an external force applied through the electrode member (e.g., the electrode member 121 of FIGS. 5 and 6).

In an embodiment, the fixed portion 153 may be brought into contact with and/or fixed to at least a portion of the connecting member (e.g., the first portion 141 of the connecting member 140 of FIG. 7) to fix the conductive structure 150 to the connecting member 140. The fixed portion 153 may include a first extending portion 153-1 and the second extending portion 153-2 disposed to face at least part of the first extending portion 153-1. According to an embodiment, the fixed portion 153 may include the first extending portion 153-1 extending from the base portion 151 in the first direction D1, a third extending portion 153-3 extending from the first extending portion 153-1 in the third direction D3, and the second extending portion 153-2 extending from the third extending portion 153-3 in the second direction D2. For example, the third extending portion 153-3 may extend in the third direction D3 from part of the first extending portion 153-1 (e.g., part of an end portion of the first extending portion 153-1 in the first direction D1), and the second extending portion 153-2 may extend in the second direction D2 from the third extending portion 153-3.

In an embodiment, the first extending portion 153-1 and the second extending portion 153-2 may be spaced apart from each other by the third extending portion 153-3. The third extending portion 153-3 may connect an end portion of the first extending portion 153-1 and an end portion of the second extending portion 153-2 that extend in directions substantially parallel to each other and may form a separation space G having a specified gap between the first extending portion 153-1 and the second extending portion 153-2. For example, the first extending portion 153-1 and the second extending portion 153-2 may be formed to face each other with the separation space G therebetween. According to an embodiment, at least part of the second extending portion 153-2 may be curved in the third direction D3. For example, a first separation space G1 between one portion of the second extending portion 153-2 and one portion of the first extending portion 153-1 may differ from a second separation space G2 between another portion of the second extending portion 153-2 and another portion of the first extending portion 153-1. According to the illustrated embodiment, the first separation space G1 may be formed to be larger than the second separation space G2. However, the disclosure is not limited to the illustrated embodiment, and according to various embodiments of the disclosure, the conductive structure 150 may be configured such that the first separation space G1 is smaller than the second separation space G2. Furthermore, according to various embodiments, the conductive structure 150 may be configured such that the size of the separation space G is gradually increased in the second direction D2.

In an embodiment, the contact portion 152 may be spaced apart from the connecting member (e.g., the connecting member 140 of FIGS. 5 to 7, 8A, and 8B) as the conductive structure 150 includes the separation space G. For example, the second extending portion 153-2 of the fixed portion 153 may be brought into contact with and fixed to the connecting member 140, and the first extending portion 153-1 of the fixed portion 153 and the contact portion 152 (e.g., the flat region 152a) may form substantially the same plane. When the second extending portion 153-2 is brought into contact with the connecting member 140 (e.g., the first portion 141 of the connecting member 140 of FIG. 7), the first extending portion 153-1 and the contact portion 152 may be spaced apart from one surface of the connecting member 140 (e.g., the first surface 141a of the first portion 141 of FIG. 7) by the separation space G. According to an embodiment, the separation space G may provide a space in which the conductive structure 150 overlaps the switch (e.g., the switch 148 of FIGS. 4 and 5 or the first switch 148a of FIG. 7). Furthermore, the separation space G may provide a space in which the contact portion 152 of the conductive structure 150 moves relative to the fixed portion 153.

In an embodiment, the fixed portion 153 may include a first fixed portion 153a and a second fixed portion 153b that extend on opposite sides of the contact portion 152. For example, the first fixed portion 153a and the second fixed portion 153b may be formed to be symmetrical to each other with respect to the contact portion 152. Each of the first fixed portion 153a and the second fixed portion 153b may include the first extending portion 153-1, the second extending portion 153-2, and the third extending portion 153-3. For example, the second extending portion 153-2 of the first fixed portion 153a and the second extending portion 153-2 of the second fixed portion 153b of the conductive structure 150 may be brought into contact with and fixed to the connecting member (e.g., the first portion 141 of the connecting member 140 of FIG. 7). The contact portion 152 may be configured to move relative to the first fixed portion 153a and the second fixed portion 153b in the third direction D3 in the state of being located between the first fixed portion 153a and the second fixed portion 153b.

In an embodiment, the conductive structure 150 may include a reinforcement structure (e.g., a plurality of bending portions 159 and/or a plurality of slits 158) for distributing a load transmitted to the conductive structure 150 when the conductive structure 150 is pressed by the electrode member 121 and enhancing the durability of the conductive structure 150.

In an embodiment, the conductive structure 150 may include at least one slit 158 formed in a partial region of the first extending portion 153-1 of the fixed portion 153. According to various embodiments of the disclosure, one or more slits 158 may be formed. The slit 158 may be formed by cutting part of the first extending portion 153-1 long in the first direction D1 or the second direction D2. For example, the slit 158 may be formed to extend to the base portion 151 or extend to an end portion of the first extending portion 153-1 that faces the first direction D1. The slit 158 may be formed substantially parallel to the elastic groove 154.

In an embodiment, the slit 158 may include a first slit 158*a* and a second slit 158*b* staggered with respect to each other. The first slit 158*a* may be cut to extend from a partial region of the first extending portion 153-1 to an end portion of the base portion 151, and the second slit 158*b* may be cut to extend from a partial region of the base portion 151 to an end portion of the first extending portion 153-1. For example, the first extending portion 153-1 of the fixed portion 153 may be formed in a zigzag shape or a "Z" shape by the first slit 158*a* and the second slit 158*b*. The first extending portion 153-1 may include a first region 155 extending from the base portion 151 in the first direction D1, a second region 156 extending from the first region 155 in the second direction D2, and a third region 157 extending from the second region 156 in the first direction D1. The first slit 158*a* may be formed between the first region 155 and the second region 156, and the second slit 158*b* may be formed between the second region 156 and the third region 157. For example, the third extending portion 153-3 of the fixed portion 153 may extend from the third region 157 in the second direction D2. According to the illustrated embodiment, as the plurality of slits 158 are formed in the fixed portion 153, the conductive structure 150 may distribute a load transmitted to the conductive structure 150 in several directions. However, the number and/or shape of slits 158 is not limited to the illustrated embodiment, and according to various embodiments of the disclosure, the slit 158 may be omitted, or a third slit (not illustrated) may be further included.

In an embodiment, the conductive structure 150 may include the plurality of bending portions 159 formed on an end portion of the base portion 151 or an end portion of the first extending portion 153-1. The plurality of bending portions 159 may include a first bending portion 159*a* formed on the end portion of the base portion 151 and bent in the third direction D3 and a second bending portion 159*b* formed on the end portion of the first extending portion 153-1 and bent in the third direction D3. By forming the plurality of bending portions 159 by bending the end portion of the base portion 151 and the end portion of the first extending portion 153-1 in the third direction D3, the total area of the conductive structure 150 may be increased, and an increase in the length of the conductive structure 150 in the first direction D1 or the second direction D2 may be avoided.

According to the illustrated embodiment, the first bending portion 159*a* may extend from a partial region of the base portion 151 where the second slit 158*b* is cut, and the second bending portion 159*b* may extend from a partial region of the first extending portion 153-1 where the first slit 158*a* is cut. Accordingly, the total area of the conductive structure 150 capable of supporting the slit 158 may be increased, and the durability of the conductive structure 150 may be improved. However, the number and/or positions of bending portions 159 are not limited to the illustrated embodiment, and according to various embodiments of the disclosure, at least one of the first bending portion 159*a* or the second bending portion 159*b* may be omitted.

According to an embodiment of the disclosure, the conductive structure 150 may include the contact portion 152 with which the electrode member (e.g., the electrode member 121 of FIGS. 5 and 6) is brought into contact, and the contact portion 152 may be formed to be movable relative to the fixed portion 153 in response to an operation of pressing the electrode member 121 (e.g., movement of the electrode member 121 in the third direction D3). Furthermore, according to an embodiment of the disclosure, the conductive structure 150 may be configured such that the curved region 152*b* is formed in the contact portion 152, and the curved region 152*b* may be formed in a shape bent in the third direction D3, for example, a direction toward the connecting member (e.g., the connecting member 140 of FIGS. 5 to 7, 8A, and 8B) or the switch (e.g., the switch 148 of FIG. 5 or the first switch 148*a* of FIG. 7). Accordingly, a vertical assembly structure of the conductive structure 150 may be implemented (e.g., refer to FIGS. 10, 11A, and 11B).

Figure 10:
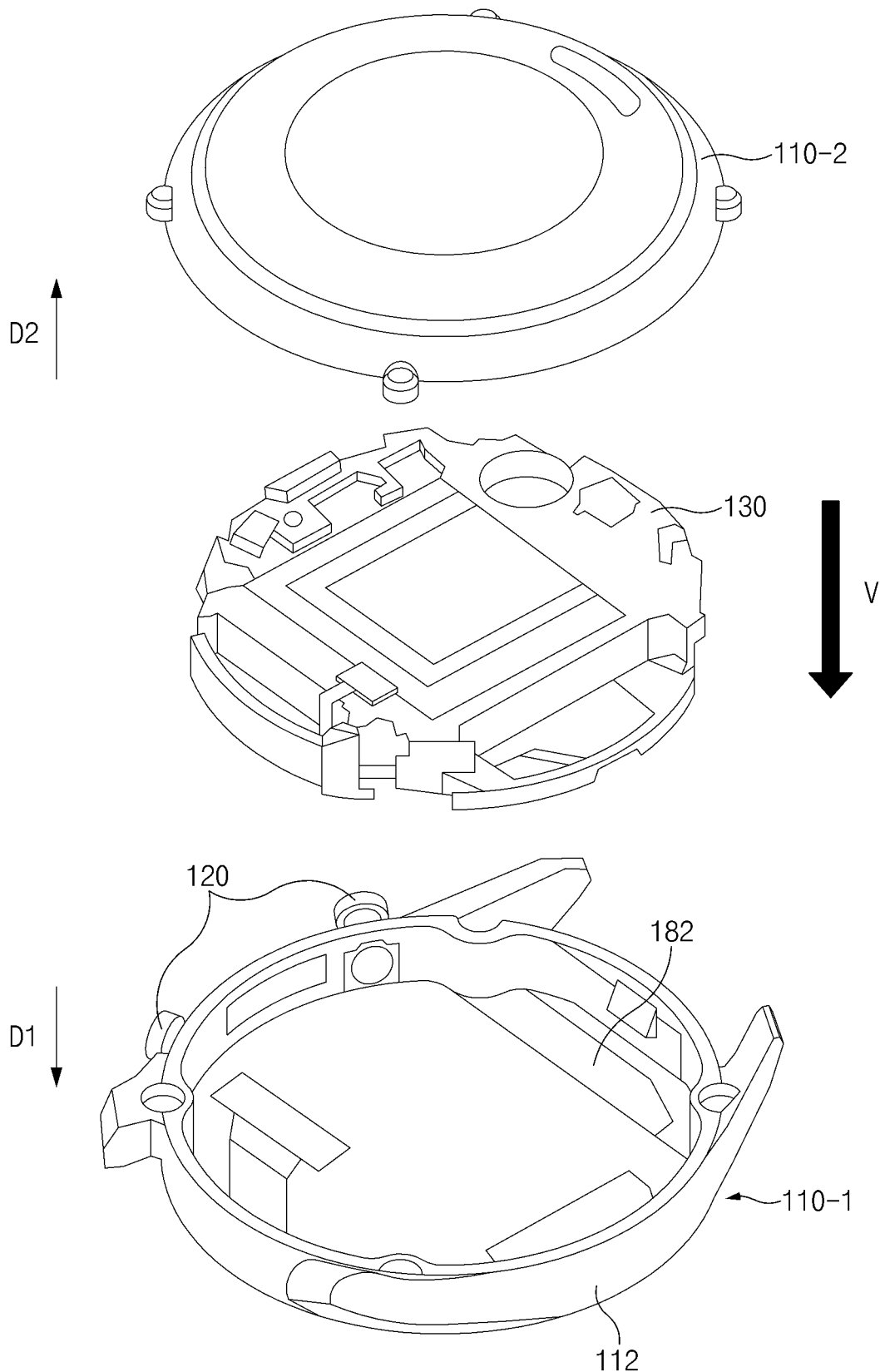
FIG. 10 is a view illustrating an operation of assembling a front case, the bracket, and a rear case of the electronic device according to an embodiment of the disclosure.

FIG. 10 is a view illustrating an operation of assembling the front case, the bracket, and the rear case of the electronic device according to an embodiment of the disclosure.

Figure 11A:
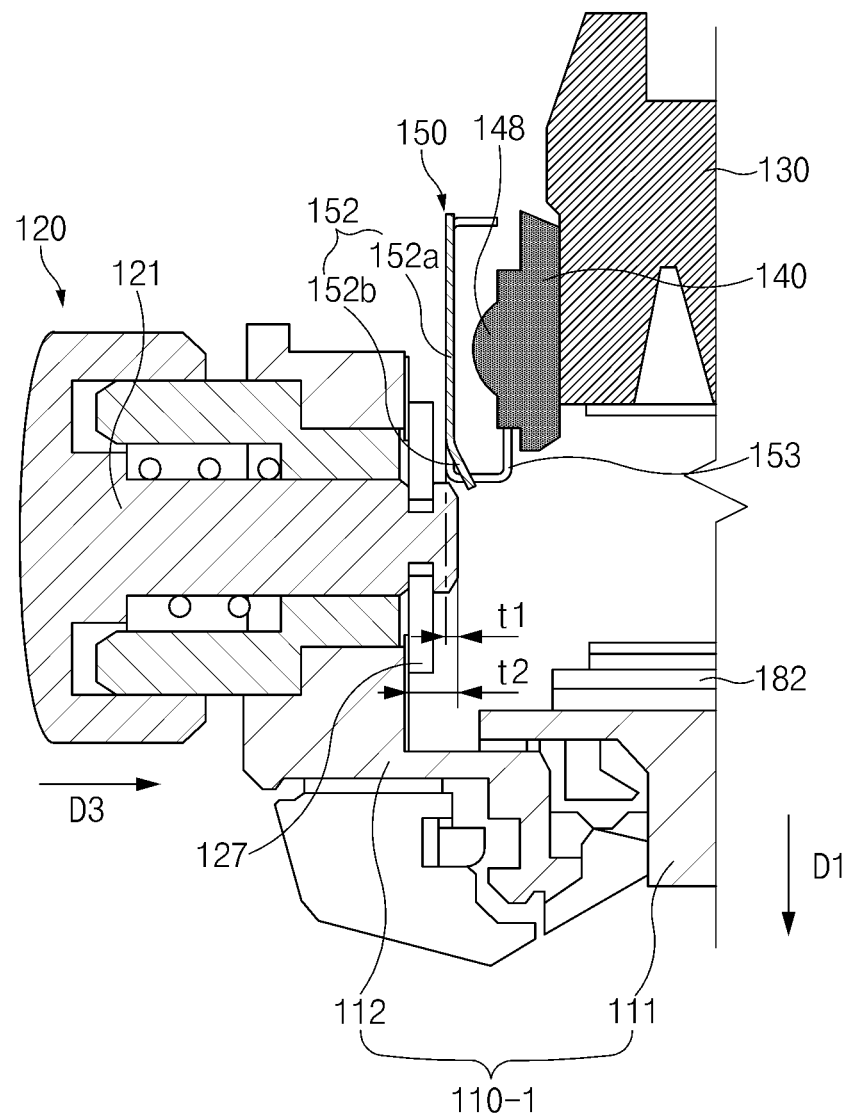
FIG. 11A is a view illustrating an operation of assembling the front case and the bracket of the electronic device according to an embodiment of the disclosure.
Figure 11B:
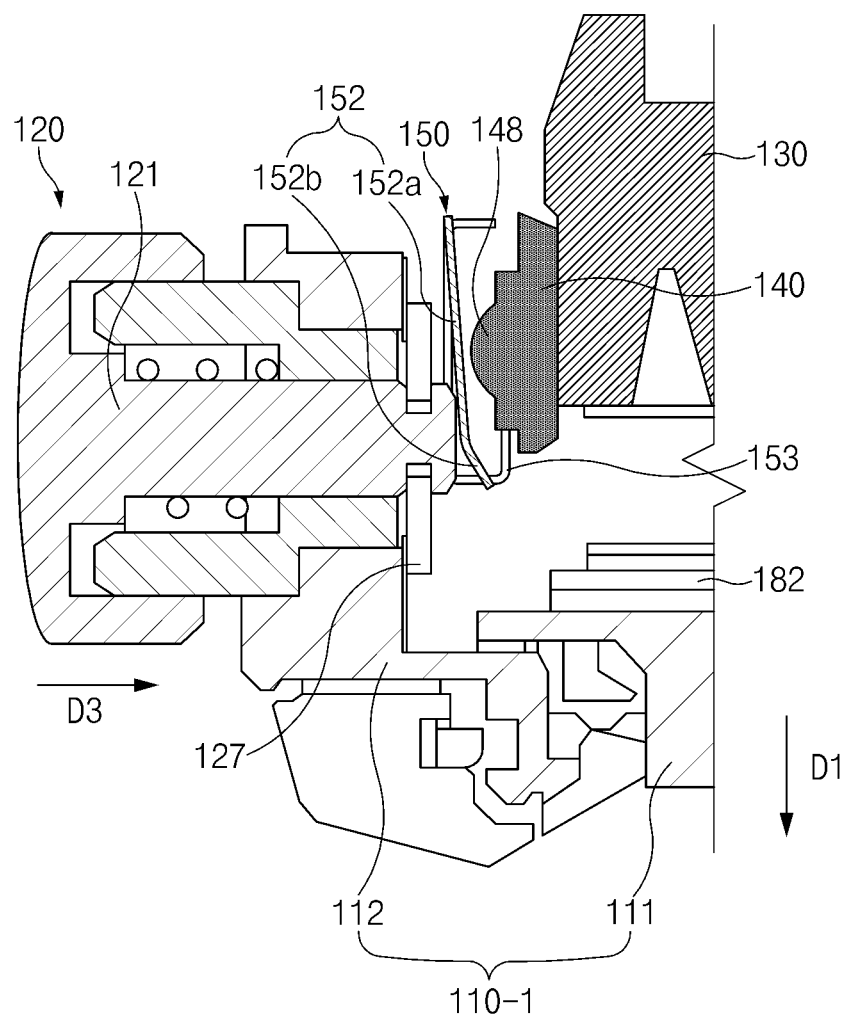
FIG. 11B is a view illustrating an operation of assembling the front case and the bracket of the electronic device according to an embodiment of the disclosure.

FIGS. 11A and 11B are views illustrating an operation of assembling the front case and the bracket of the electronic device according to various embodiments of the disclosure.

FIGS. 11A and 11B may be views illustrating an operation in which the button member and the conductive structure are brought into contact with each other as the bracket having the conductive structure disposed thereon is vertically assembled in the front case having the button member disposed therein.

Referring to FIGS. 10, 11A, and 11B, the electronic device 100 according to various embodiments may include the housing 110 including the front case 110-1 and the rear case 110-2, the button member 120 coupled to the side frame 112 of the front case 110-1, and the bracket 130 on which the connecting member 140 and the conductive structure 150 are disposed.

According to an embodiment, the electronic device 100 may be constituted by an assembly structure of the front case 110-1, the bracket 130, and the rear case 110-2. The front case 110-1, the bracket 130, and the rear case 110-2 may be assembled in a direction perpendicular thereto. For example, the front case 110-1, the bracket 130, and the rear case 110-2 may be aligned in a direction substantially parallel to the first direction D1 or the second direction D2. The bracket 130 may be assembled with the front case 110-1 in a vertical direction (e.g., an assembly direction V), and the rear case 110-2 may be assembled with the bracket 130 and the front case 110-1 in the vertical direction (e.g., the assembly direction V). For example, the assembly direction V of the front case 110-1, the bracket 130, and the rear case 110-2 may be substantially the same as the first direction D1.

In an embodiment, the conductive structure 150 and the connecting member 140 may be assembled in the front case 110-1 together with the bracket 130 in the state of being disposed on the bracket 130. For example, the conductive structure 150 and the connecting member 140 may be disposed on the side surface of the bracket 130. When the bracket 130 is assembled in the front case 110-1, the conductive structure 150 and the connecting member 140 may move together with the bracket 130 and may be located between the side frame 112 and the bracket 130.

In an embodiment, the conductive structure 150 may include the curved region 152b so as to be assembled in the front case 110-1 together with the bracket 130 in the vertical direction (e.g., the first direction D1). As described above (e.g., refer to FIGS. 9A to 9D), the conductive structure 150 may be configured (e.g., the elastic groove 154 of FIGS. 9A to 9D) such that the contact portion 152 is movable relative to the fixed portion 153 in a direction toward the switch 148 or a direction away from the switch 148. Furthermore, the contact portion 152 may include the flat region 152a and the curved region 152b extending from the flat region 152a in the first direction D1, and the curved region 152b may be formed in a shape bent toward the switch 148 along the first direction D1.

In an embodiment, to remain brought into contact with one end portion of the electrode member 121, the conductive structure 150 may be assembled to overlap the electrode member 121. As illustrated in FIG. 11A, the button member 120 may be coupled to the front case 110-1. The bracket 130 may be assembled in the front case 110-1 in the first direction D1 such that the conductive structure 150 and the one end portion of the electrode member 121 overlap each other by a specified thickness t1. In an embodiment, in the state of being assembled in the front case 110-1, the button member 120 may be located such that the one end portion of the electrode member 121 protrudes from the side frame 112 in the third direction D3 by a specified thickness t2. For example, when the electrode member 121 is coupled to the fixed member 127, at least a portion of the electrode member 121 may be located to protrude from the inner wall of the side frame 112 in the third direction D3 by the specified thickness t2.

In an embodiment, the conductive structure 150 may be deformed in a predetermined shape by the curved region 152b when the bracket 130 is assembled in the front case 110-1 in the vertical direction (e.g., the first direction D1). As illustrated in FIG. 11B, when the bracket 130 moves toward the front case 110-1 in the first direction D1, the curved region 152b of the conductive structure 150 and the electrode member 121 may make contact with each other, and the conductive structure 150 may move in the first direction D1. For example, when the conductive structure 150 moves in the first direction D1, the one end portion of the electrode member 121 may relatively move in the second direction D2 along the curved region 152b, and the conductive structure 150 may be assembled in the first direction D1.

According to the illustrated embodiment, as the conductive structure 150 and the electrode member 121 overlap each other (e.g., by the specified thickness t1), the contact portion 152 may move relative to the fixed portion 153 in the third direction D3. In the case in which the conductive structure 150 and the electrode member 121 are assembled to overlap each other, when the bracket 130 is completely assembled in the front case 110-1, the conductive structure 150 may maintain the form in which the contact portion 152 is moved relative to the fixed portion 153 in the third direction D3. However, the disclosure is not necessarily limited to the illustrated embodiment. According to various embodiments of the disclosure, the conductive structure 150 and the electrode member 121 may be assembled without overlapping each other in a state in which a surface of the contact portion 152 and the one end portion of the electrode member 121 are located to form substantially the same plane.

In the electronic device 100 according to an embodiment of the disclosure, the curved region 152b may be formed in at least a portion of the conductive structure 150. The curved region 152b may be formed to be bent toward the switch 148 along the assembly direction V of the bracket 130. Accordingly, the conductive structure 150 may be assembled in the front case 110-1 in the vertical direction (e.g., the first direction D1) together with the bracket 130 in the state of being disposed on the bracket 130, and thus a separate structure for supporting the conductive structure 150 may not be required. Furthermore, as the electrode member 121 moves along the curved region 152b when the conductive structure 150 is assembled in the vertical direction, the conductive structure 150 may be assembled in the vertical direction without being damaged. According to an embodiment, in the case in which the conductive structure 150 is assembled in the front case 110-1 together with the bracket 130 in the vertical direction (e.g., the first direction D1), the contact portion 152 of the conductive structure 150 may be spaced apart from the switch 148.

Figure 12:
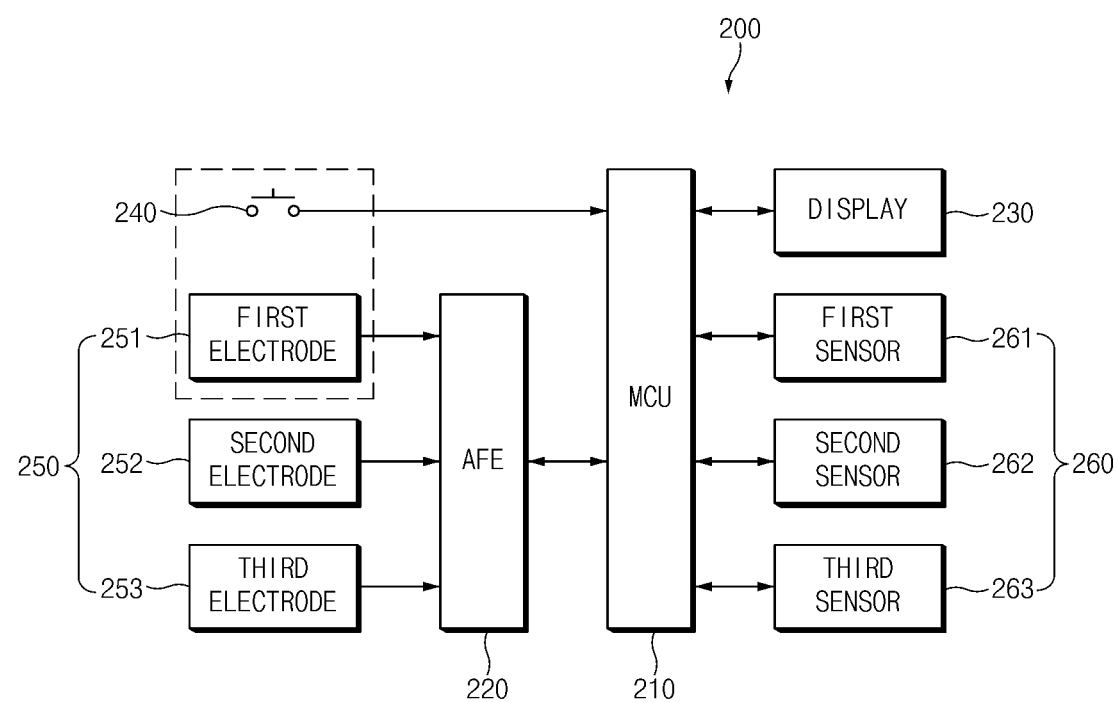
FIG. 12 is a block diagram illustrating a user biometric information acquisition system of an electronic device according to an embodiment of the disclosure.

FIG. 12 is a block diagram illustrating a user biometric information acquisition system of an electronic device according to an embodiment of the disclosure.

Referring to FIG. 12, the electronic device 200 according to an embodiment (e.g., the electronic device 100 of FIGS. 1 to 6) may include the micro controller unit (MCU) 210 (e.g., control circuitry or a processor), an analog front end (AFE) 220 (e.g., an analog-digital converter (ADC)), a display 230 (e.g., the display 182 of FIGS. 3 to 5, 10, 11A, and 11B), a switch member 240 (e.g., the switch 148 of FIGS. 5, 11A, and 11B or the first switch 148a of FIG. 7), a plurality of electrodes 250, and/or at least one sensor 260. As described with reference to FIGS. 1 to 4, the electronic device 200 may include various types of electronic parts, such as a memory, a communication module, a battery (e.g., the battery 183 of FIGS. 4 and 5), or an antenna connecting terminal.

In an embodiment, among the plurality of electrodes 250, a first electrode 251 may be, for example, an electrode member (e.g., the electrode member 121 of FIGS. 5, 6, 11A, and 11B) of a button member (e.g., the button member 120 of FIGS. 1, 3 to 6, 10, 11A, and 11B) and may be electrically connected with a circuit board (e.g., the circuit board 170 of FIGS. 3 to 5, 8A, and 8B) through a conductive structure (e.g., the conductive structure 150 of FIGS. 4 to 7, 8A, 8B, 9A to 9D, 11A, and 11B) and a connecting member (e.g., the connecting member 140 of FIGS. 4 to 7, 8A, 8B, 9A to 9D, 11A, and 11B). For example, the first electrode 251 may be electrically connected with the analog front end 220. Among the plurality of electrodes 250, a second electrode 252 and/or a third electrode 253 may be one of electrodes (e.g., the first electrode region 118 and/or the second electrode region 119 of FIG. 2) disposed in a housing (e.g., the housing 110 of FIGS. 1 to 5). The second electrode 252 and/or the third electrode 253 may be electrically connected with the analog front end 220.

In an embodiment, the second electrode 252 and the third electrode 253 may make contact with a user's body in a state in which the user has the electronic device 200 on. At least the second electrode 252 and the third electrode 253 may obtain user biometric information when the user has the electronic device 200 on.

In an embodiment, as the user brings another body part (e.g., a finger) rather than the body part (e.g., a wrist) on which the electronic device 200 is worn into contact with the first electrode 251, the electronic device 200 may detect biometric information of the user using the first electrode 251, the second electrode 252, and the third electrode 253. For example, when the user has the electronic device 200 on and touches the first electrode 251, a flow of an electrical signal may be formed between the first electrode 251 and the second electrode 252 or between the first electrode 251 and the third electrode 253 through the user's body, and the electronic device 200 may detect user biometric information from the flow of the electrical signal. According to various embodiments of the disclosure, when the user having the electronic device 200 on the user's left wrist touches the first electrode 251 with the right hand, a flow of an electrical signal may be formed to pass through a part of the user's body that is close to the heart. As the other body part rather than the body part on which the electronic device 200 is worn and the first electrode 251 make contact with each other, accuracy in obtaining biometric information (e.g., an electrocardiogram) may be improved.

In an embodiment, the analog front end 220 may be an analog-digital converter. For example, the analog front end 220 may receive an analog signal through the first electrode 251, the second electrode 252, and/or the third electrode 253 and may convert the received signal into a digital signal. The digital signal converted in the analog front end 220 may be transmitted to the processor, for example, the micro controller unit 210. The micro controller unit 210 may be disposed in the housing (e.g., the housing 110 of FIGS. 1 to 5), for example, on the circuit board (e.g., the circuit board 170 of FIGS. 3 to 5, 8A, and 8B). The micro controller unit 210 may obtain user biometric information, based on the signal received from the analog front end 220. For example, the micro controller unit 210 may output the obtained biometric information on the display 230, may store the obtained biometric information in a memory, or may transmit the obtained biometric information to another electronic device or a sever through a communication module and/or an antenna. When the biometric information based on the received signal satisfies a specified condition, the micro controller unit 210 may provide a warning signal (e.g., a screen or sound for warning) to the user through the display 230 or a speaker (not illustrated), or may transmit the corresponding biometric information to a related institution (e.g., a hospital). For example, the specified condition may include a state in which there is an abnormality in the user's health.

In an embodiment, even though the switch member 240 (e.g., the switch 148 of FIGS. 5, 11A, and 11B or the first switch 148a of FIG. 7) does not operate, the electronic device 200 or the micro controller unit 210 may detect biometric information of the user when the user's body touches the first electrode 251 (e.g., the electrode member 121 of FIGS. 5, 6, 11A, and 11B). For example, when the user having the electronic device 200 on brings a part of the user's body into contact with the first electrode 251, the electronic device 200 or the micro controller unit 210 may detect that a signal flow is formed between the first electrode 251 and the second electrode 252 (or, the third electrode 253) through the part of the user's body. According to an embodiment, the electronic device 200 or the micro controller unit 210 may measure the time during which the signal flow continues and may determine whether the signal flow is maintained beyond a predetermined time period. When it is determined that the signal flow is maintained beyond the predetermined time period, the electronic device 200 or the micro controller unit 210 may determine that the user wants to measure biometric information and may detect biometric information.

According to various embodiments of the disclosure, the electronic device 200 may not detect biometric information even though the user's body touches the first electrode 251 (e.g., the electrode member 121 of FIGS. 5, 6, 11A, and 11B) and may detect biometric information for a predetermined time period when the switch member 240 (e.g., the switch 148 of FIGS. 5, 11A, and 11B or the first switch 148a of FIG. 7) generates an input signal. Operation of the switch member 240 may mean a case in which the button member (e.g., the button member 120 of FIGS. 1, 3 to 6, 10, 11A, and 11B) is pressed and may correspond to a state in which the user's body substantially touches the first electrode 251. For example, the user may execute a command to detect biometric information in the electronic device 200 by operating the switch member 240 by pressing the button member 120, and the electronic device 200 or the micro controller unit 210 may detect biometric information of the user, based on the operation of the switch member 240. In this case, the switch member 240 may be located between the first electrode 251 and the analog front end 220.

In an embodiment, the electronic device 200 or the micro controller unit 210 may measure or store biometric information of the user from a time point that exceeds predetermined time. For example, the electronic device 200 or the micro controller unit 210 may temporarily store a signal or signal flow detected up to the predetermined time and may store the temporarily stored signal or signal flow as the current biometric information of the user at the time point that exceeds the predetermined time. In another example, the electronic device 200 or the micro controller unit 210 may additionally detect or store biometric information of the user for an additional period of time from the time point that exceeds the predetermined time, in addition to storing the signal up to the predetermined time as biometric information.

In an embodiment, the at least one sensor 260 (e.g., the sensor module (including biosensor modules 117, 118, and 119) of FIG. 2) may be one of a gesture sensor, a gyro sensor, an atmospheric pressure sensor, a magnetic sensor, an acceleration sensor, a temperature/humidity sensor, a proximity sensor, or an illuminance sensor that is not illustrated and may generate an electrical signal or a data value that corresponds to an operational state inside the electronic device 200 or an operational environment external to the electronic device 200. According to various embodiments of the disclosure, the at least one sensor 260 may be constituted by a plurality of sensors (e.g., a first sensor 261, a second sensor 262, and/or a third sensor 263). The micro controller unit 210 may control other electronic parts, such as the display 230, based on information collected through the at least one sensor 260.

An electronic device 100 according to an embodiment of the disclosure may include a housing 110, a button member 120 coupled to the housing 110, at least a portion of the button member being exposed outside the housing 110, a bracket 130 that is disposed in the housing 110 and that has a circuit board 170 seated thereon, a connecting member 140 disposed on the bracket 130 and electrically connected with the circuit board 170, and a conductive structure 150 disposed on a portion of the connecting member 140 to make contact with the button member 120 and electrically connected with the connecting member 140 and the button member 120. The conductive structure 150 may include a contact portion 152 that at least partially makes contact with the button member 120 and a fixed portion 153 that extends from the contact portion 152 to the connecting member 140 to space the contact portion 152 and the connecting member 140 apart from each other, and the contact portion 152 may have a shape in which at least part of the contact portion 152 is bent toward the connecting member 140.

In various embodiments, the conductive structure 150 may further include a base portion 151, and the contact portion 152 and the fixed portion 153 may extend in a first direction D1 from different parts of the base portion 151.

In various embodiments, the contact portion 152 may include a flat region 152a that extends from the base portion 151 and makes contact with the button member 120 and a curved region 152b that extends from the flat region 152a, and the curved region 152b may be formed in a shape bent toward the connecting member 140 along the first direction D1.

In various embodiments, an elastic groove 154 that extends long in the first direction D1 may be formed between the contact portion 152 and the fixed portion 153, and the contact portion 152 may be formed to be movable relative to the fixed portion 153 in a direction toward or away from the connecting member 140.

In various embodiments, the fixed portion 153 may include a first extending portion 153-1 that extends from the base portion 151 in the first direction D1 and a second extending portion 153-2 that extends from part of the first extending portion 153-1 in a second direction D2 opposite to the first direction D1 to face at least part of the first extending portion 153-1. The second extending portion 153-2 may be spaced apart from the first extending portion 153-1 by a predetermined gap, and at least part of the second extending portion 153-2 may be brought into contact with and fixed to the connecting member 140.

In various embodiments, the fixed portion 153 may further include a third extending portion 153-3 that connects the first extending portion 153-1 and the second extending portion 153-2, and the third extending portion 153-3 may extend in a direction substantially perpendicular to the first extending portion 153-1 and the second extending portion 153-2.

In various embodiments, at least one slit 158 may be formed in a partial region of the first extending portion 153-1.

In various embodiments, the housing 110 may include a front surface 110A, a rear surface 110B that faces away from the front surface 110A, and a side surface 110C that surrounds a space between the front surface 110A and the rear surface 110B. The first direction D1 may be a direction substantially toward the front surface 110A, and the second direction D2 may be a direction substantially toward the rear surface 110B.

In various embodiments, the connecting member 140 may include a first portion 141 on which a first switch 148a is disposed and a connector 144 that extends from the first portion 141 and that is connected with the circuit board 170, and the conductive structure 150 may be disposed on the first portion 141 to at least partially overlap the first switch 148a.

In various embodiments, the first portion 141 of the connecting member 140 may include a first surface 141a on which the first switch 148a and the conductive structure 150 are disposed and a second surface 141b that faces away from the first surface 141a, and the first switch 148a may at least partially overlap the conductive structure 150 when the first surface 141a is viewed from above.

In various embodiments, when the button member 120 is pressed, the first switch 148a may be pressed by the conductive structure 150 in a direction in which the button member 120 is pressed.

In various embodiments, the connecting member 140 may further include a second portion 142 that extends from the first portion 141 and has a microphone 149 disposed thereon and a third portion 143 that extends from the second portion 142 and has a second switch 148b disposed thereon. The connector 144 may extend from the second portion 142 in a direction substantially opposite to a direction in which the third portion 143 extends.

In various embodiments, the bracket 130 may have, on a side surface thereof, a seating region 131 on which the connecting member 140 is seated, and the seating region 131 may be formed in a shape corresponding to the connecting member 140.

In various embodiments, the housing 110 may have, in a side surface 110C thereof, a button hole into which at least a portion of the button member 120 is inserted. The button member 120 may include an electrode member 121 that extends from the outside of the housing 110 to the inside of the housing 110 through the button hole, at least a portion of the electrode member 121 being exposed on the side surface 110C of the housing 110, and a support member 122 that supports the electrode member 121, at least a portion of the support member 122 being disposed in the button hole.

In various embodiments, the electrode member 121 may be electrically connected with the circuit board 170 through contact of one end portion of the electrode member 121 with at least a partial region of the contact portion 152.

In various embodiments, the button member 120 may further include an elastic member 129 disposed between the electrode member 121 and the support member 122. The electrode member 121 may be movable relative to the support member 122 as the electrode member 121 is pressed and the pressing is released. The elastic member 129 may provide an elastic force to move the electrode member 121 in a direction opposite to a direction of the pressing when the pressing is released.

In various embodiments, the electronic device may further include control circuitry (e.g., a processor) disposed on the circuit board 170 and a biosensor module (including biosensor modules 117, 118, and 119), at least a portion of which is exposed outside the housing 110. The control circuit may obtain biometric information of a user, based on signals received from the electrode member 121 and the biosensor module (including biosensor modules 117, 118, and 119), respectively.

A wearable electronic device 100 according to an embodiment of the disclosure may include a housing 110 that forms at least a portion of an exterior of the electronic device 100 and that includes a front surface 110A, a rear surface 110B that faces away from the front surface 110A, and a side surface 110C that surrounds a space between the front surface 110A and the rear surface 110B, a display 182 disposed in the housing 110 so as to be visually exposed through the front surface 110A of the housing 110, a button member 120 coupled to the side surface 110C of the housing 110, at least a portion of the button member 120 being exposed outside the housing 110, a bracket 130 that is disposed between the display 182 and the rear surface 110B and that has a circuit board 170 seated thereon, a connecting member 140 disposed on the bracket 130 to face toward the side surface 110C of the housing 110 and electrically connected with the circuit board 170, and a conductive structure 150 disposed on a portion of the connecting member 140 to make contact with the button member 120 and electrically connected with the connecting member 140 and the button member 120. The conductive structure 150 may include a contact portion 152 that at least partially makes contact with the button member 120 and a fixed portion 153 that extends from the contact portion 152 to the connecting member 140 to space the contact portion 152 and the connecting member 140 apart from each other. The contact portion 152 may include a flat region 152a that makes contact with the button member 120 and a curved region 152b that curvedly extends from the flat region 152a. The curved region 152b may be formed in a shape bent toward the connecting member 140 along a direction toward the front surface 110A of the housing 110.

In various embodiments, the housing 110 may have, in the side surface 110C thereof, a button hole into which at least a portion of the button member 120 is inserted. The button member 120 may include an electrode member 121 that extends from the outside of the housing 110 to the inside of the housing 110 through the button hole, at least a portion of the electrode member 121 being exposed on the side surface 110C of the housing 110. The electrode member 121 may be electrically connected with the circuit board 170 through the conductive structure 150 and the connecting member 140 as one end portion of the electrode member 121 is brought into contact with at least a partial region of the contact portion 152.

In various embodiments, the connecting member 140 may include a substrate portion 141, 142, and 143 on which a switch 148 and the conductive structure 150 are disposed and a connector 144 extending from the substrate portion 141, 142, and 143 and connected with the circuit board 170. The substrate portion 141, 142, and 143 may include a first surface 141a on which the switch 148 and the conductive structure 150 are disposed and a second surface 141b that faces away from the first surface 141a and faces a side surface of the bracket 130. The switch 148 may be disposed to partially overlap the conductive structure 150 when the first surface 141a is viewed from above.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a non-transitory storage medium (e.g., internal memory or external memory) that is readable by a machine (e.g., the electronic device 100 or 200). For example, a processor (e.g., analog front end) of the machine (e.g., the electronic device 100 or 200) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a button member coupled to the housing, at least a portion of the button member being exposed outside the housing;
   a bracket disposed in the housing, a circuit board being disposed on the bracket;
   a connecting member disposed on the bracket and electrically connected with the circuit board, the connecting member including a first surface on which a first switch is disposed; and
   a conductive structure disposed on a portion of the connecting member to make contact with the button member and being electrically connected to the connecting member and the button member,
   wherein the conductive structure includes a contact portion and a fixed portion, the contact portion being configured to at least partially make contact with the button member and the fixed portion being configured to extend from the contact portion to the connecting member to space the contact portion and the connecting member apart from each other,
   wherein the contact portion includes a curved region formed in a shape in which at least part of the contact portion is bent toward the connecting member, and
   wherein the first switch does not overlap the curved region when the first surface is viewed from above.

2. The electronic device of claim 1,
   wherein the conductive structure further includes a base portion, and
   wherein the contact portion and the fixed portion extend in a first direction from different parts of the base portion.

3. The electronic device of claim 2,
   wherein the contact portion includes a flat region configured to extend from the base portion and make contact with the button member and the curved region configured to extend from the flat region, and
   wherein the curved region is formed in a shape bent toward the connecting member along the first direction.

4. The electronic device of claim 2,
   wherein an elastic groove configured to extend long in the first direction is formed between the contact portion and the fixed portion, and
   wherein the contact portion is formed to be movable relative to the fixed portion in a direction toward or away from the connecting member.

5. The electronic device of claim 2,
   wherein the fixed portion includes a first extending portion configured to extend from the base portion in the first direction and a second extending portion configured to extend from part of the first extending portion in a second direction opposite to the first direction to face at least part of the first extending portion, and
   wherein the second extending portion is spaced apart from the first extending portion by a predetermined gap, and at least part of the second extending portion is brought into contact with and fixed to the connecting member.

6. The electronic device of claim 5,
   wherein the fixed portion further includes a third extending portion configured to connect the first extending portion and the second extending portion, and
   wherein the third extending portion extends in a direction substantially perpendicular to the first extending portion and the second extending portion.

7. The electronic device of claim 5, wherein at least one slit is formed in a partial region of the first extending portion.

8. The electronic device of claim 5,
   wherein the housing includes a front surface, a rear surface configured to face away from the front surface, and a side surface configured to surround a space between the front surface and the rear surface,
   wherein the first direction is a direction substantially toward the front surface, and
   wherein the second direction is a direction substantially toward the rear surface.

9. The electronic device of claim 1,
   wherein the connecting member includes a first portion on which the first switch is disposed and a connector configured to extend from the first portion and connected with the circuit board, and
   wherein the conductive structure is disposed on the first portion to at least partially overlap the first switch.

10. The electronic device of claim 3,
    wherein the connecting member includes a first portion including the first surface on which the first switch and the conductive structure are disposed and a second surface configured to face away from the first surface, and
    wherein the first switch at least partially overlaps the flat region when the first surface is viewed from above.

11. The electronic device of claim 10, wherein in response to the button member being pressed, the first switch is pressed by the conductive structure in a direction in which the button member is pressed.

12. The electronic device of claim 9,
    wherein the connecting member further includes a second portion configured to extend from the first portion and having a microphone disposed thereon and a third portion configured to extend from the second portion and having a second switch disposed thereon, and
    wherein the connector extends from the second portion in a direction substantially opposite to a direction in which the third portion extends.

13. The electronic device of claim 1,
    wherein the bracket has, on a side surface thereof, a seating region on which the connecting member is disposed, and
    wherein the seating region is formed in a shape corresponding to the connecting member.

14. The electronic device of claim 1,
    wherein the housing has, in a side surface thereof, a button hole into which at least a portion of the button member is inserted, and
    wherein the button member includes:
      an electrode member, at least a portion of which is exposed on the side surface of the housing, the electrode member being configured to extend from an outside of the housing to an inside of the housing through the button hole, and
      a support member, at least a portion of which is disposed in the button hole, the support member being configured to support the electrode member.

15. The electronic device of claim 14, wherein the electrode member is electrically connected with the circuit board through contact of one end portion of the electrode member with at least a partial region of the contact portion.

16. The electronic device of claim 14,
wherein the button member further includes an elastic member disposed between the electrode member and the support member,
wherein the electrode member is movable relative to the support member as the electrode member is pressed and the pressing is released, and
wherein the elastic member provides an elastic force to move the electrode member in a direction opposite to a direction of the pressing in response to the pressing being released.

17. The electronic device of claim 14, further comprising:
control circuitry disposed on the circuit board; and
biosensor circuitry, at least a portion of which is exposed outside the housing,
wherein the control circuitry obtains biometric information of a user, based on signals received from the electrode member and the biosensor circuitry, respectively.

18. A wearable electronic device comprising:
a housing including a front surface, a rear surface configured to face away from the front surface, and a side surface configured to surround a space between the front surface and the rear surface, the housing being configured to form at least a portion of an exterior of the wearable electronic device;
a display disposed in the housing and being visually exposed through the front surface of the housing;
a button member coupled to the side surface of the housing, at least a portion of the button member being exposed outside the housing;
a bracket disposed between the display and the rear surface, a circuit board being disposed on the bracket;
a connecting member electrically connected with the circuit board and being disposed on the bracket to face toward the side surface of the housing, the connecting member including a first surface on which a switch is disposed; and
a conductive structure disposed on a portion of the connecting member, the conductive structure contacting the button member and being electrically connected with the connecting member and the button member,
wherein the conductive structure includes a contact portion and a fixed portion, the contact portion being configured to at least partially make contact with the button member and the fixed portion being configured to extend from the contact portion to the connecting member to space the contact portion and the connecting member apart from each other,
wherein the contact portion includes a flat region and a curved region, the flat region being configured to make contact with the button member and the curved region being configured to curvedly extend from the flat region,
wherein the curved region is formed in a shape bent toward the connecting member along a direction toward the front surface of the housing, and
wherein the switch does not overlap the curved region when the first surface is viewed from above.

19. The wearable electronic device of claim 18,
wherein the housing has, in the side surface thereof, a button hole into which at least a portion of the button member is inserted,
wherein the button member includes an electrode member, at least a portion of which is exposed on the side surface of the housing, the electrode member being configured to extend from the outside of the housing to an inside of the housing through the button hole, and
wherein the electrode member is electrically connected with the circuit board through the conductive structure and the connecting member as one end portion of the electrode member is brought into contact with at least a partial region of the contact portion.

20. The wearable electronic device of claim 18,
wherein the connecting member includes a substrate portion on which the switch and the conductive structure are disposed and a connector configured to extend from the substrate portion and connected with the circuit board,
wherein the substrate portion includes the first surface on which the switch and the conductive structure are disposed and a second surface configured to face away from the first surface and face a side surface of the bracket, and
wherein the switch is disposed to partially overlap the flat region when the first surface is viewed from above.

21. The electronic device of claim 1,
wherein the contact portion includes a flat region and a curved region, and
wherein the curved region is bent from the flat region in a direction at which at least part of the contact portion is bent toward the connecting member and the bracket.

* * * * *